(12) United States Patent
Fujii

(10) Patent No.: US 11,567,946 B2
(45) Date of Patent: Jan. 31, 2023

(54) DOCUMENT SEARCH APPARATUS AND DOCUMENT SEARCH METHOD

(71) Applicant: KABUSHIKI KAISHA TOSHIBA, Tokyo (JP)

(72) Inventor: Hiroko Fujii, Komae (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 17/187,003

(22) Filed: Feb. 26, 2021

(65) Prior Publication Data

US 2022/0083558 A1 Mar. 17, 2022

(30) Foreign Application Priority Data

Sep. 16, 2020 (JP) .............................. JP2020-155216

(51) Int. Cl.
*G06F 16/2457* (2019.01)
*G06F 16/248* (2019.01)
(52) U.S. Cl.
CPC ...... *G06F 16/24575* (2019.01); *G06F 16/248* (2019.01); *G06F 16/24578* (2019.01)
(58) Field of Classification Search
None
See application file for complete search history.

(56) References Cited

U.S. PATENT DOCUMENTS

| | | | | |
|---|---|---|---|---|
| 10,671,619 B2* | 6/2020 | Miyoshi | ................ | G06F 40/247 |
| 10,696,963 B2* | 6/2020 | Daley | .................... | C12N 15/67 |
| 2016/0246863 A1* | 8/2016 | Sexton | .................. | G06F 16/955 |
| 2016/0321331 A1* | 11/2016 | Uchiumi | ............... | G06F 9/5072 |
| 2018/0010136 A1* | 1/2018 | Hunt | .......................... | G16B 5/00 |
| 2018/0039633 A1* | 2/2018 | Miyoshi | ............ | G06F 16/24556 |
| 2018/0273934 A1* | 9/2018 | Daley | ................. | C12N 15/1086 |
| 2021/0224307 A1* | 7/2021 | Fujii | .................... | G06V 30/413 |
| 2021/0366015 A1* | 11/2021 | Kurosawa | ............. | G06F 16/248 |
| 2022/0083558 A1* | 3/2022 | Fujii | ................. | G06F 16/24575 |

FOREIGN PATENT DOCUMENTS

| | | |
|---|---|---|
| JP | 2013-182289 A | 9/2013 |
| JP | 2021-114234 A | 8/2021 |

OTHER PUBLICATIONS

Zhao et al., "Ngram2vec: Learning Improved Word Representations from Ngram co-occurrence Statistics", Proceedings of the 2017 Conference on Empirical Methods in Natural Language Processing, 2017, pp. 244-253.

* cited by examiner

*Primary Examiner* — Kim T Nguyen
(74) *Attorney, Agent, or Firm* — Oblon, McClelland, Maier & Neustadt, L.L.P.

(57) ABSTRACT

According to one embodiment, a document search apparatus includes processing circuitry. The processing circuitry acquires an event text relating to an event, acquire a phenomenon expression from the event text, the phenomenon expression indicating a phenomenon of the event, acquires a synonymous expression having a meaning similar to a meaning of the phenomenon expression, and acquires at least one co-occurrence expression co-occurring with an expression selected from among the phenomenon expression and the synonymous expression. The processing circuitry performs search using the selected expression and one of the at least one co-occurrence expression as search terms to acquire a related-event document relating to the event from document information.

11 Claims, 21 Drawing Sheets

| 1011 | Product A | [Title] Water leakage of ○○ [Phenomenon] Water leakage from ○○ support welding portion······ |
| 1012 | Product B | [Title] Damage of ○△ [Phenomenon] ··· [Cause] ··· [Measures] ··· |
| 1013 | Product C | [Title] Memory leak of △△ [Phenomenon] ············································ |

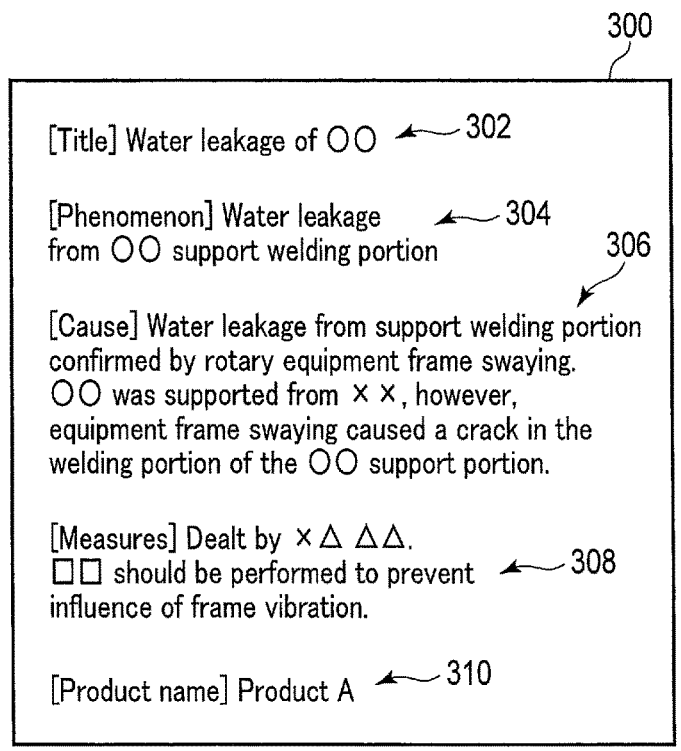

[Title] Water leakage of ○○  ←302

[Phenomenon] Water leakage ←304
from ○○ support welding portion
306

[Cause] Water leakage from support welding portion confirmed by rotary equipment frame swaying. ○○ was supported from ×＊, however, equipment frame swaying caused a crack in the welding portion of the ○○ support portion.

[Measures] Dealt by ×△ △△.
□□ should be performed to prevent ←308
influence of frame vibration.

[Product name] Product A  ←310

FIG. 3

| | | | | |
|---|---|---|---|---|
| 1 | 1011 | 1 | Product A | Water leakage from support welding portion confirmed |
| 2 | 1011 | 2 | Product A | Rotary equipment frame swaying |
| 3 | 1011 | 3 | Product A | Equipment frame swaying |
| 4 | 1011 | 4 | Product A | Crack in welding portion of ○○ support portion |
| 5 | 1221 | 1 | Product B | Vibrating when △○ operation |
| 6 | 1221 | 2 | Product B | Damage in ○△ piping welding portion |
| 7 | 2121 | 1 | Product C | Date of □□ measurement data not added |
| 8 | 2222 | 1 | Product C | Abnormality notification display function indicating abnormality of □△ failed |
| 9 | 2222 | 2 | Product C | Sump pump in ○□ facility stopped |

F I G. 6

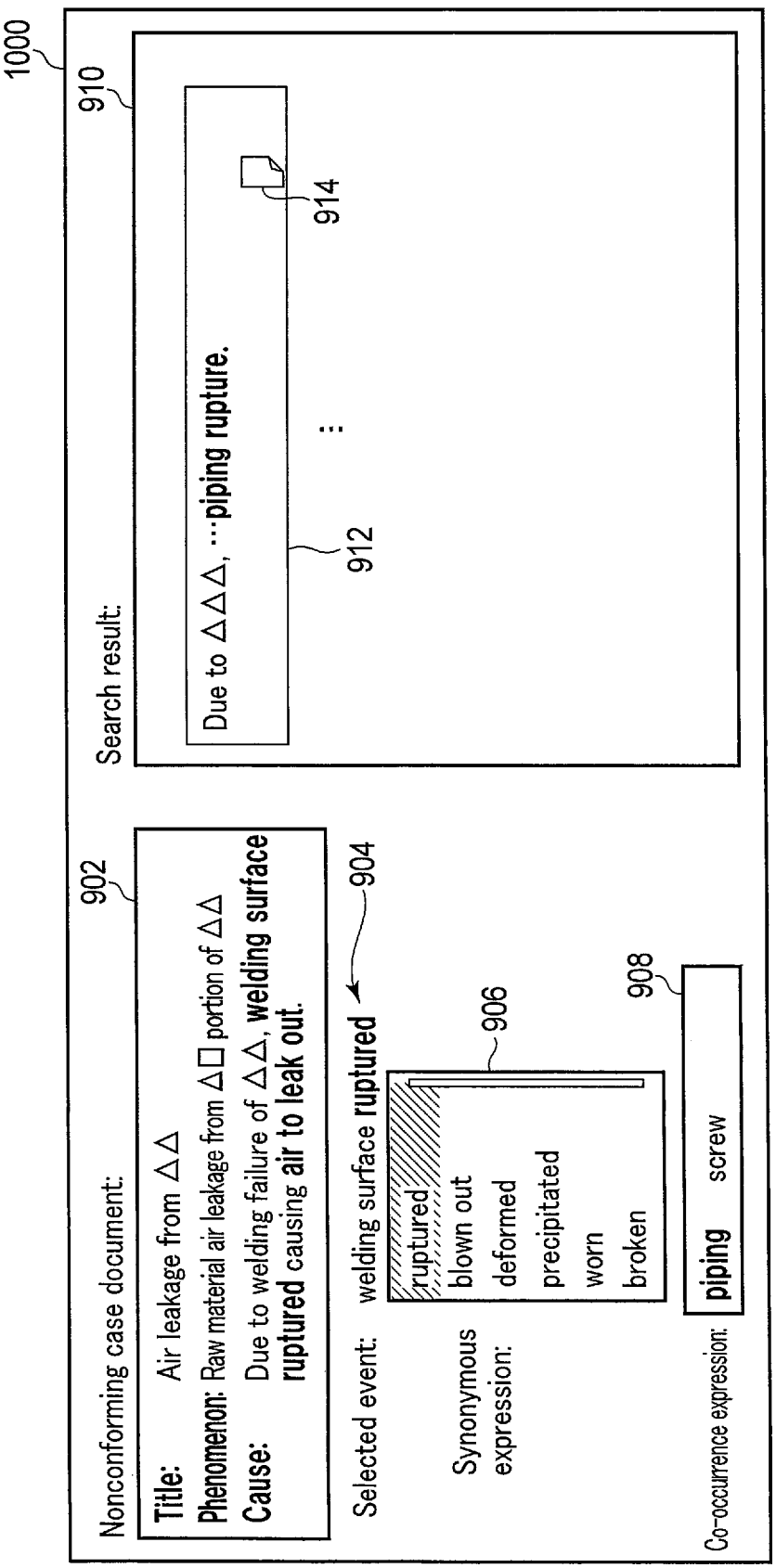
F I G. 10

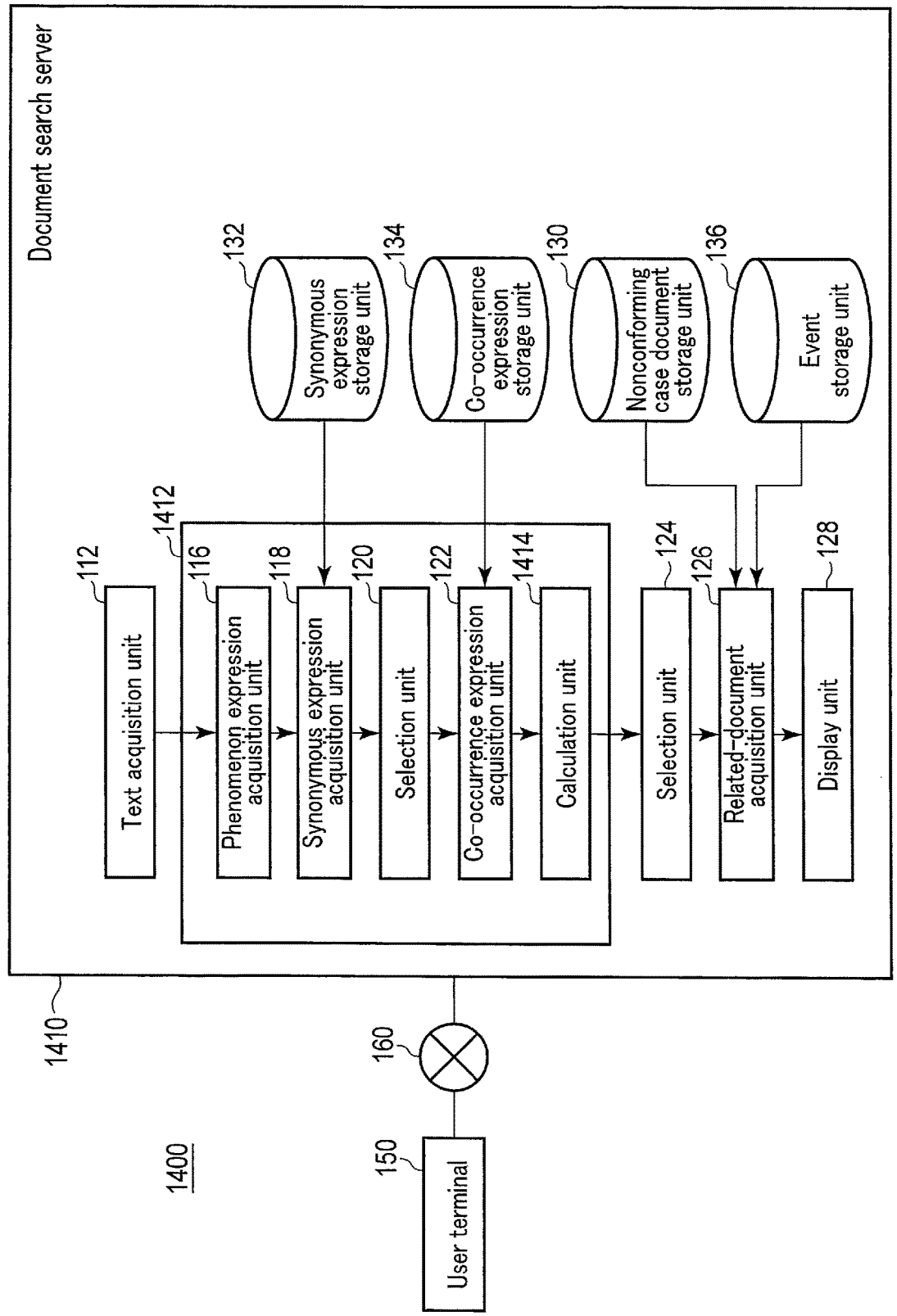
F I G. 14

| 1 | Leakage | Seepage, discharge ⋯ |
|---|---------|----------------------|
| 2 | Exceed  | Excessive, over- ⋯   |
|   |         |                      |

1800, 1802, 1804, 1806

F I G. 18

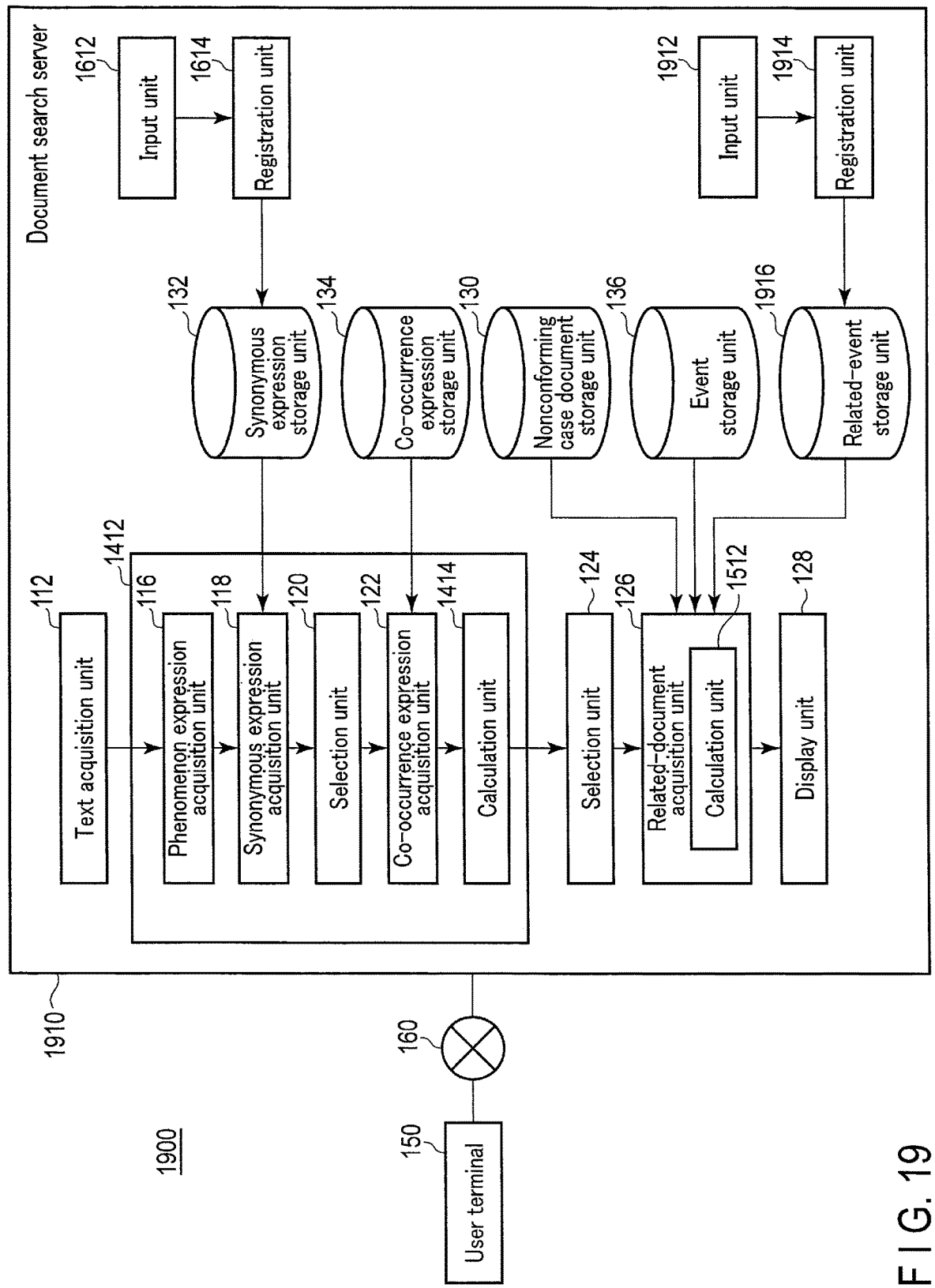
F I G. 19

FIG. 21

| | 2102 | 2104 | 2106 | 2108 | 2110 | 2112 | 2114 |
|---|---|---|---|---|---|---|---|
| 1 | 2021 | 4 | Welding surface ruptured | 2939 | 5 | Fuse to blow out |
| 2 | 2021 | 4 | Welding surface ruptured | 4001 | 3 | OO portion to break |
| 3 | 2021 | 5 | Air to leak out | 3001 | 2 | Memory leak occurred |
| 4 | 3131 | 1 | xxxx | 3232 | 3 | zzzz |

2100

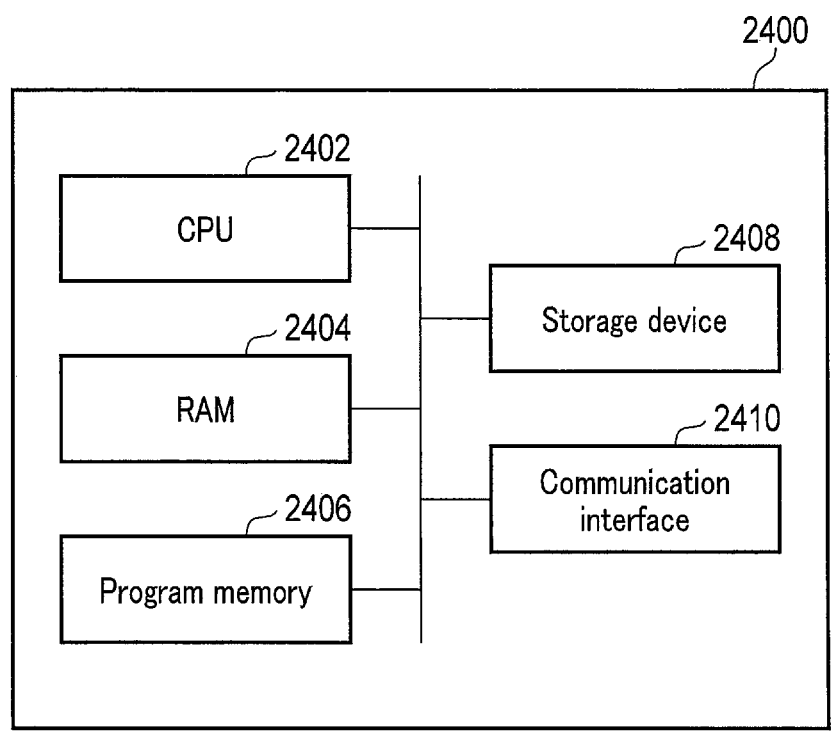
F I G. 23

DOCUMENT SEARCH APPARATUS AND DOCUMENT SEARCH METHOD

CROSS-REFERENCE TO RELATED APPLICATIONS

This application is based upon and claims the benefit of priority from Japanese Patent Application No. 2020-155216, filed Sep. 16, 2020, the entire contents of which are incorporated herein by reference.

FIELD

Embodiments described herein relate generally to a document search technique.

BACKGROUND

For product designs of, for example, a heat power plant, a hydraulic power plant, a nuclear power plant, an air-conditioning management system for buildings, and a water and sewage management system, it is important for a designer to grasp problems that have occurred with existing products in the past, and prevent the same problems from occurring again. Particularly in the case of the above products, since a long service life is expected, a designer can be involved in only a limited number of product designs. Since the knowledge relating to problems in the past and measures to be taken thereto are mostly dependent upon an experienced designer, unless such knowledge is passed on to a novice designer through guidance, necessary knowledge may not be preserved. Therefore, in recent years, a system has been introduced for storing phenomena, causes, and measures relating to problems that occurred in the past (hereinafter, referred to as nonconforming cases) in a database, and, when a new product is designed, referring to the nonconforming cases that occurred to existing products similar thereto.

BRIEF DESCRIPTION OF THE DRAWINGS

FIG. 2 is a diagram showing nonconforming case document information stored in a nonconforming case document storage unit shown in FIG. 1.

FIG. 3 is a diagram showing a nonconforming case document shown in FIG. 2.

FIG. 6 is a diagram showing an example of information stored in an event storage unit shown in FIG. 1.

FIG. 10 is a diagram for explaining an operation of the document search server of FIG. 1.

FIG. 14 is a diagram showing a document search system according to a second embodiment.

FIG. 18 is a diagram showing an example of user registration synonymous expression information stored in a synonymous expression storage unit shown in FIG. 17.

FIG. 19 is a diagram showing a document search system according to a fifth embodiment.

FIG. 21 is a diagram showing an example of related-event information stored in a related-event storage unit shown in FIG. 19.

FIG. 23 is a diagram showing a hardware configuration example of a computer realizing a document search server according to each embodiment.

DETAILED DESCRIPTION

Figure 1:
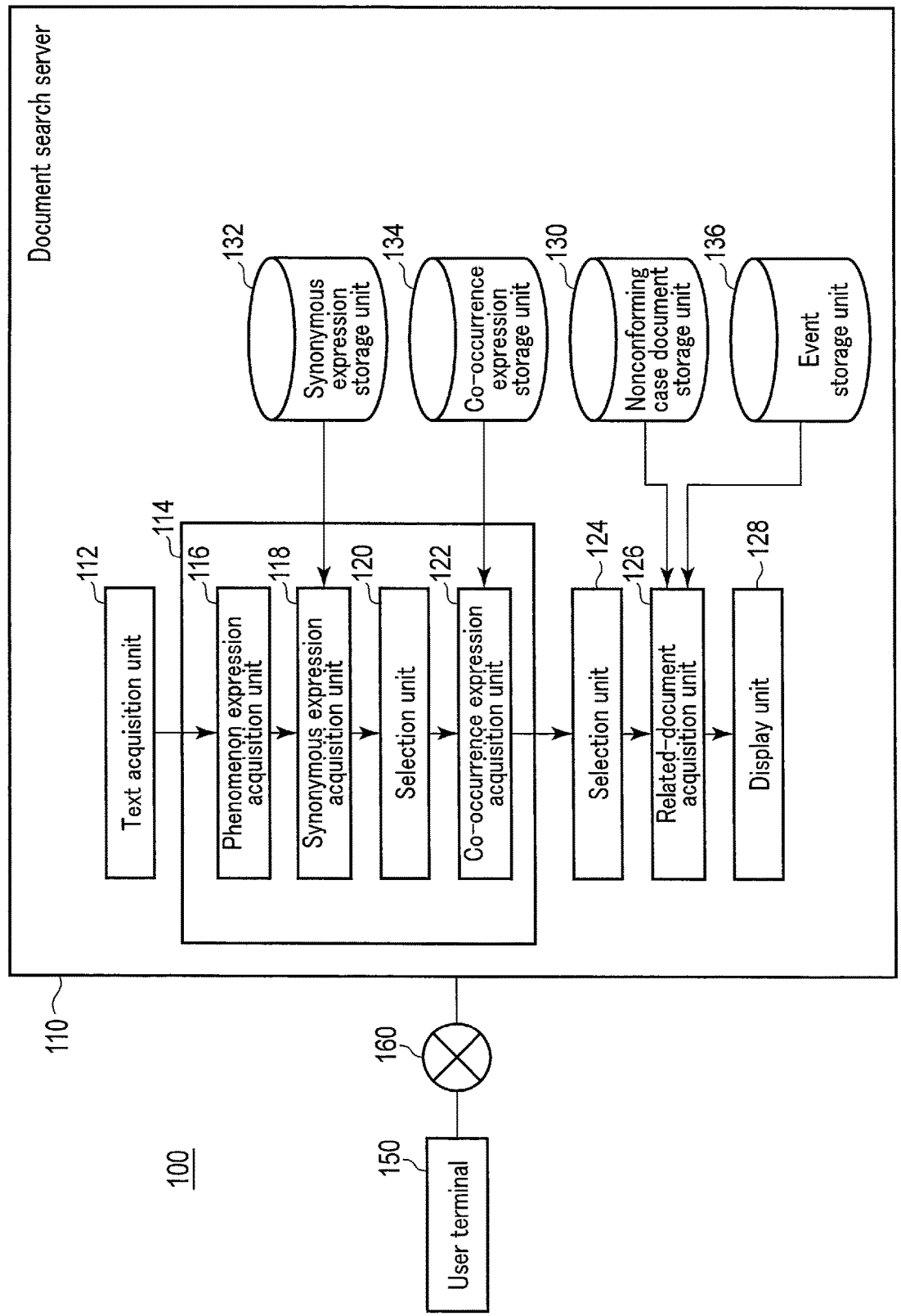
FIG. 1 is a diagram showing a document search system according to a first embodiment.

According to one embodiment, a document search apparatus includes processing circuitry. The processing circuitry is configured to acquire an event text relating to an event, acquire a phenomenon expression from the event text, the phenomenon expression being an expression indicating a phenomenon of the event, acquire a synonymous expression, the synonymous expression being an expression having a meaning similar to a meaning of the phenomenon expression, acquire at least one co-occurrence expression, the at least one co-occurrence expression being an expression co-occurring with an expression selected from among a plurality of expressions including the phenomenon expression and the synonymous expression, perform search using the selected expression and one co-occurrence expression from the at least one co-occurrence expression as search terms to acquire at least one related-event document relating to the event from document information including a plurality of documents prepared in advance, and output the at least one related-event document.

Hereinafter, embodiments will be described with reference to the accompanying drawings. To avoid redundant explanations, like reference numerals will be used to denote like components throughout the drawings.

First Embodiment

FIG. 1 schematically shows a document search system 100 according to a first embodiment. As shown in FIG. 1, the document search system 100 includes a document search server 110 and a user terminal 150. The document search server 110 communicates with the user terminal 150 via a network 160, such as the Internet. A document search function (described later) of the document search server 110 is provided to a user as a Web application. The user utilizes the document search function by using a Web browser installed on the user terminal 150. The user terminal 150 may be a computer including an input device and a display device, such as a desktop computer or a smart phone.

The document search server 110 is used by the user when designing, manufacturing, or operating a product, to search for a document describing nonconforming cases that occurred with other products in the past. The product may be, but is not limited to, a heat power plant, a hydraulic power plant, a nuclear power plant, an air-conditioning management system for buildings, or a water and sewage management system. The nonconforming cases include phenomena, causes, and measures, etc. relating to undesirable incidents, such as problems. The document search server 110 includes a text acquisition unit 112, an expression acquisition unit 114, a selection unit 124, a related-document acquisition unit 126, a display unit (also referred to as an output unit) 128, a nonconforming case document storage unit 130, a synonymous expression storage unit 132, a co-occurrence expression storage unit 134, and an event storage unit 136.

The text acquisition unit 112 acquires an event text to be a search source. The event text is a text relating to an event such as a problem incident. Specifically, the event text corresponds to a portion of description expressing a problem incident in a nonconforming case document. The event text may include an expression describing a target and a phenomenon of the event. For example, the event text may be a text describing a cause or a result of the product becoming nonconforming (for example, a cause or a result of a problem that occurred with a product). The event text may be described in a form of "what (phenomenon of event) occurred in what (target of event)".

The expression acquisition unit 114 acquires an expression to be used for a search of a document relating to the event based on the event text acquired by the text acquisition unit 112. The expression acquisition unit 114 includes a phenomenon expression acquisition unit 116, a synonymous expression acquisition unit 118, a selection unit 120, and a co-occurrence expression acquisition unit 122.

The phenomenon expression acquisition unit 116 acquires a phenomenon expression from the event text acquired by the text acquisition unit 112. For example, the phenomenon expression acquisition unit 116 acquires the phenomenon expression by performing natural language processing including morphological analysis with respect to the event text. The phenomenon expression is an expression describing a phenomenon of an event. The phenomenon expression may be a word or a phrase expressing an operation. For example, the phenomenon expression may be, but is not limited to, a verb, a noun expressing an operation, or a phrase including a noun expressing an operation.

The synonymous expression acquisition unit 118 acquires a synonymous expression, which is an expression having a meaning similar to that of the phenomenon expression acquired by the phenomenon expression acquisition unit 116. For example, the synonymous expression acquisition unit 118 acquires the synonymous expression by referring to synonymous expression information stored in the synonymous expression storage unit 132 by using the phenomenon expression. The synonymous expression information will be described later. The synonymous expression may be a word or a phrase expressing an operation. For example, the synonymous expression may be, but is not limited to, a verb, a noun expressing an operation, or a phrase including a noun expressing an operation.

The selection unit 120 selects one expression from among a plurality of expressions including the phenomenon expression acquired by the phenomenon expression acquisition unit 116 and the synonymous expression acquired by the synonymous expression acquisition unit 118. The selection unit 120 may perform the selection based on an input by the user.

The co-occurrence expression acquisition unit 122 acquires a co-occurrence expression, which is an expression co-occurring with the expression selected by the selection unit 120. For example, the co-occurrence expression acquisition unit 122 acquires the co-occurrence expression by referring to co-occurrence expression information stored in the co-occurrence expression storage unit 134 by using the selected expression. The co-occurrence expression information will be described later. An expression that co-occurs with a certain expression (for example, a word) indicates a word with a high probability of being used with the certain expression (for example, that appears in the same text). The co-occurrence expression is an expression that may be a target of the event. The co-occurrence expression may be, but is not limited to, a noun other than a noun expressing an operation. In the present embodiment, the co-occurrence expression is a noun indicating a product, a component, or a material, etc.

The selection unit 124 selects one co-occurrence expression from among at least one co-occurrence expressions acquired by the co-occurrence expression acquisition unit 122. Specifically, in a case where one co-occurrence expression is acquired by the co-occurrence expression acquisition unit 122, the selection unit 124 selects the acquired co-occurrence expression, and, in a case where a plurality of co-occurrence expressions are acquired by the co-occurrence expression acquisition unit 122, the selection unit 124 selects one co-occurrence expression from among the acquired co-occurrence expressions. The selection unit 124 may perform selection based on an input by the user.

The related-document acquisition unit 126 performs document search by referring to the event storage unit 136 using the expression selected by the selection unit 120 and the co-occurrence expression selected by the selection unit 124 as search terms to acquire a related-event document, which is a document related to the event. For example, the related-document acquisition unit 126 uses the search terms to perform search with respect to the event information stored in the event storage unit 136, and acquires a document matching the search terms as the related-event document. The event information will be described later. The event storage unit 136 forms a database to be referred to by the related-document acquisition unit 126.

A display unit 128 displays information on an interface screen for the user to operate. For example, the display unit 128 displays the event text acquired by the text acquisition unit 112, the phenomenon expression acquired by the phenomenon expression acquisition unit 116, the synonymous expression acquired by the synonymous expression acquisition unit 118, the co-occurrence expression acquired by the co-occurrence expression acquisition unit 122, and the document acquired by the related-document acquisition unit 126 on the interface screen. The interface screen is displayed on the display device of the user terminal 150.

FIG. 2 shows an example of document information stored in the nonconforming case document storage unit 130. Document information 200 shown in FIG. 2 includes an identification number 202, a product name 204, and a nonconforming case document 206 in association with each other. The identification number 202 is identification information for identifying entries of the document information 200. For example, a nonconforming case document with an identification number of 1011 is a document describing a nonconforming case relating to product A. The documents are registered in the nonconforming case document storage unit 130 by another system (not shown).

FIG. 3 shows an example of the nonconforming case document. A nonconforming case document 300 shown in FIG. 3 is the nonconforming case document with an identification number of 1011 shown in FIG. 2. The nonconforming case document 300 includes descriptions relating to five items, which specifically are a title 302, a phenomenon 304, a cause 306, measures 308, and a product name 310.

Figure 4:
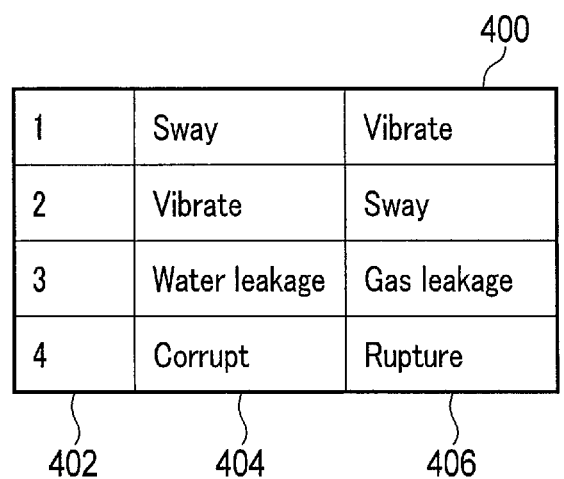
FIG. 4 is a diagram showing an example of synonymous expression information stored in a synonymous expression storage unit shown in FIG. 1.

FIG. 4 shows a synonymous expression dictionary 400, which is an example of the synonymous expression information stored in the synonymous expression storage unit 132. As shown in FIG. 4, the synonymous expression dictionary 400 includes an identification number 402, a phenomenon expression 404, and a synonymous expression 406 in association with each other. The identification number 402 is identification information for identifying entries of the synonymous expression dictionary 400. The synonymous expression 406 indicates an expression having a meaning similar to that of the phenomenon expression 404. In the example of FIG. 4, one synonymous expression is associated with each phenomenon expression; however, the synonymous expression 406 may include two or more synonymous expressions. For example, in a case where the phenomenon expression acquisition unit 116 acquires an expression "sway" as the phenomenon expression, the synonymous expression acquisition unit 118 acquires an expression "vibrate" as the synonymous expression.

The synonymous expression dictionary 400 may include a similarity between the phenomenon expression and the synonymous expression. The similarity indicates an extent to which the expressions are similar to each other. The display unit 128 may display the synonymous expression in accordance with the similarity. For example, the display unit 128 displays the synonymous expressions in a display region 906 (FIG. 9) described later from top to bottom in descending order of the similarity.

The phenomenon expression is obtained by, for example, performing morphological analysis on a text included in the nonconforming case document, and extracting a verb, a noun expressing an operation, or a phrase including a noun expressing an operation. An expression having a meaning similar to that of the phenomenon expression is obtained by a well-known method such as Zhao et al., "Ngram2vec: Learning Improved Word Representations from Ngram Co-occurrence Statistics", Proceedings of the 2017 Conference on Empirical Methods in Natural Language Processing, pp. 244-253, 2017. This document teaches a method of expanding word embedding to an n-gram (n consecutive words; hereinafter, referred to as a phrase). It should be noted that word embedding is a method of interpreting the order in which the words are placed before and after a target word as a context of the word, and learning a vector expression (embedding vector) of the word using a neural network so that words having similar meanings are placed close in a vector space. The vector expression of a phrase is learned by the method taught in the document above, and a similarity between the phrases is estimated by using a similarity between the vectors. For example, in a case where a value of a cosine similarity exceeds a predetermined threshold, the phrases are determined to be similar. Pairs of the phenomenon expression and the synonymous expression obtained in the above-mentioned manner may be studied closely using manpower to exclude pairs determined in error, and stored in the synonymous expression storage unit 132.

Figure 5:
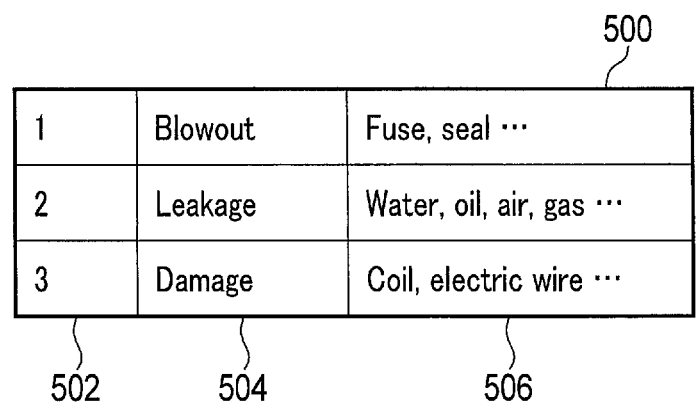
FIG. 5 is a diagram showing an example of co-occurrence expression information stored in a co-occurrence expression storage unit shown in FIG. 1.

FIG. 5 shows a co-occurrence expression dictionary 500, which is an example of the co-occurrence expression information stored in the co-occurrence expression storage unit 134. As shown in FIG. 5, the co-occurrence expression dictionary 500 includes an identification number 502, a phenomenon expression 504, and a co-occurrence expression 506 in association with each other. The co-occurrence expression 506 includes one or more co-occurrence expressions. For example, in a case where the selection unit 120 selects an expression "blowout", the co-occurrence expression acquisition unit 122 acquires expressions including "fuse" and "seal" as the co-occurrence expression.

FIG. 6 shows an example of the event information stored in the event storage unit 136. The event information is information relating to an event extracted from the nonconforming case document included in the document information stored in the nonconforming case document storage unit 130. The event is extracted from the nonconforming case document by, for example, performing natural language processing including dependency analysis with respect to each sentence in the nonconforming case document, and extracting a portion in a form of "(subject) (predicate)", including a subject and a predicate. The predicate may be limited to a verb expressing a problem phenomenon.

Event information 600 shown in FIG. 6 includes an identification number 602, an identification number 604, an identification number 606, a product name 608, and an event detail 610 in association with each other. The identification number 602 is identification information for identifying entries of the event information 600. The identification number 604 is an identification number (corresponding to the identification number 202 shown in FIG. 2) associated with a nonconforming case document of an extraction source. The identification number 606 is identification information for identifying each event. In the present embodiment, the identification number 606 indicates the order in which an event text shown in the event detail 610 emerges in the nonconforming case document of the extraction source. The product name 608 is a product name (corresponding to the product name 204 shown in FIG. 2) associated with the nonconforming case document of the extraction source. The event detail 610 is an event text. The event detail 610 may be a sentence including the event text.

For example, entries from 1 to 4 of the identification number 602 are pieces of information extracted from the nonconforming case document of which the identification number 604 is 1011 (the nonconforming case document 300 shown in FIG. 3). Since the event text "water leakage from support welding portion confirmed" is an event text that emerges first in the nonconforming case document of which the identification number 604 is 1011, the identification number 606 is 1.

For example, the related-document acquisition unit 126 performs a search on the search terms "frame" and "sway" with respect to the event information 600 stored in the event storage unit 136, and obtains an entry in which "frame" and "sway" are included in the event detail 610 (an entry in which the identification number 602 is 3).

Figure 7:
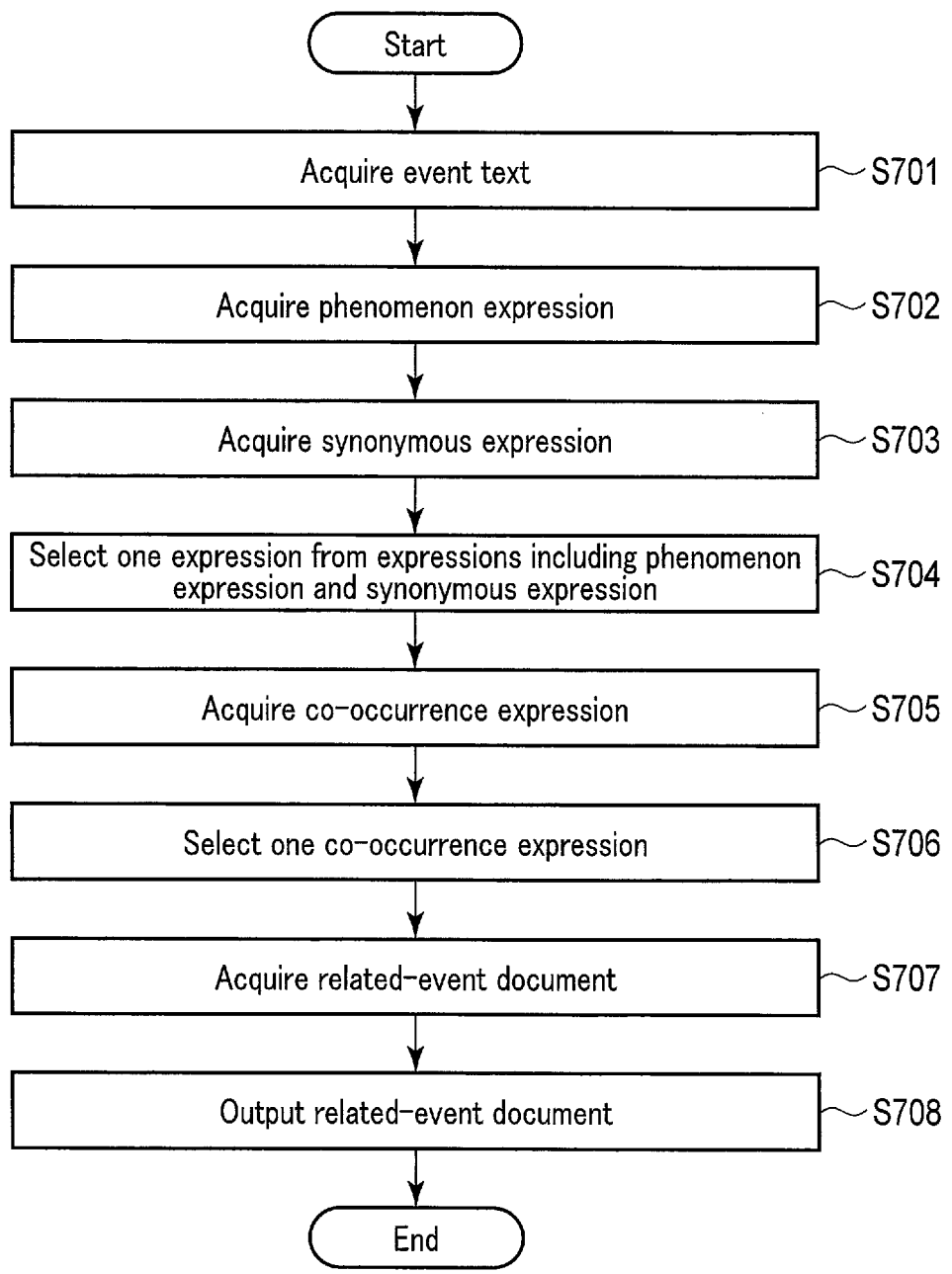
FIG. 7 is a flowchart showing a procedure of processing executed by a document search server of FIG. 1.

FIG. 7 schematically shows a procedural example of the processing executed by the document search server 110.

In step S701 of FIG. 7, the text acquisition unit 112 acquires an event text including a description relating to an event. For example, the text acquisition unit 112 acquires a text "welding surface ruptured" selected by the user on the interface screen as the event text.

In step S702, the phenomenon expression acquisition unit 116 acquires a phenomenon expression from the event text acquired by the text acquisition unit 112. For example, the phenomenon expression acquisition unit 116 acquires "ruptured", which is a verb, from the event text "welding surface ruptured" as the phenomenon expression.

In step S703, the synonymous expression acquisition unit 118 acquires a synonymous expression having a meaning similar to that of the phenomenon expression acquired by the phenomenon expression acquisition unit 116. For example, the synonymous expression acquisition unit 118 acquires a synonymous expression associated with the phenomenon expression "ruptured" in the synonymous expression dictionary 400 stored in the synonymous expression storage unit 132. For example, the synonymous expression acquisition unit 118 acquires expressions such as "blown out" and "deformed" as the synonymous expression.

In step S704, the selection unit 120 selects one expression from among a plurality of expressions including the phenomenon expression acquired by the phenomenon expression acquisition unit 116 and the synonymous expression acquired by the synonymous expression acquisition unit 118. For example, the selection unit 120 selects one expression from among a plurality of expressions based on the user's input. For example, when the user selects the expression "blown out" on the interface screen, the selection unit 120 selects the expression "blown out".

In step S705, the co-occurrence expression acquisition unit 122 acquires a co-occurrence expression, which is an expression co-occurring with the expression selected by the selection unit 120. Specifically, the co-occurrence expression acquisition unit 122 acquires a co-occurrence expression associated with the expression "blown out" in the co-occurrence expression dictionary 500 stored in the co-occurrence expression storage unit 134. For example, the co-occurrence expression acquisition unit 122 acquires expressions including "fuse", "seal", and "AC/DC" as the co-occurrence expression.

In step S706, the selection unit 124 selects one co-occurrence expression among the co-occurrence expressions acquired by the co-occurrence expression acquisition unit 122. For example, the selection unit 124 selects one co-occurrence expression from among the co-occurrence expressions based on the user's input. For example, when the user selects the co-occurrence expression "fuse" on the interface screen, the selection unit 124 selects the co-occurrence expression "fuse".

In step S707, the related-document acquisition unit 126 uses the expression selected by the selection unit 120 and the co-occurrence expression selected by the selection unit 124 as search terms to perform document search, and acquires at least one related-event document as a search result. For example, the related-document acquisition unit 126 refers to the event storage unit 136, and acquires an event text including a combination of the expression "blown out" selected by the selection unit 120 and the expression "fuse" selected by the selection unit 124 as the related-event document.

In step S708, the display unit 128 outputs the related-event document acquired by the related-document acquisition unit 126. For example, the display unit 128 transmits the related-event document to the user terminal 150 so that the related-event document is displayed on the user terminal 150.

An operation of the document search server 110 will be explained along with specific examples with reference to FIG. 8 to FIG. 13.

Figure 8:
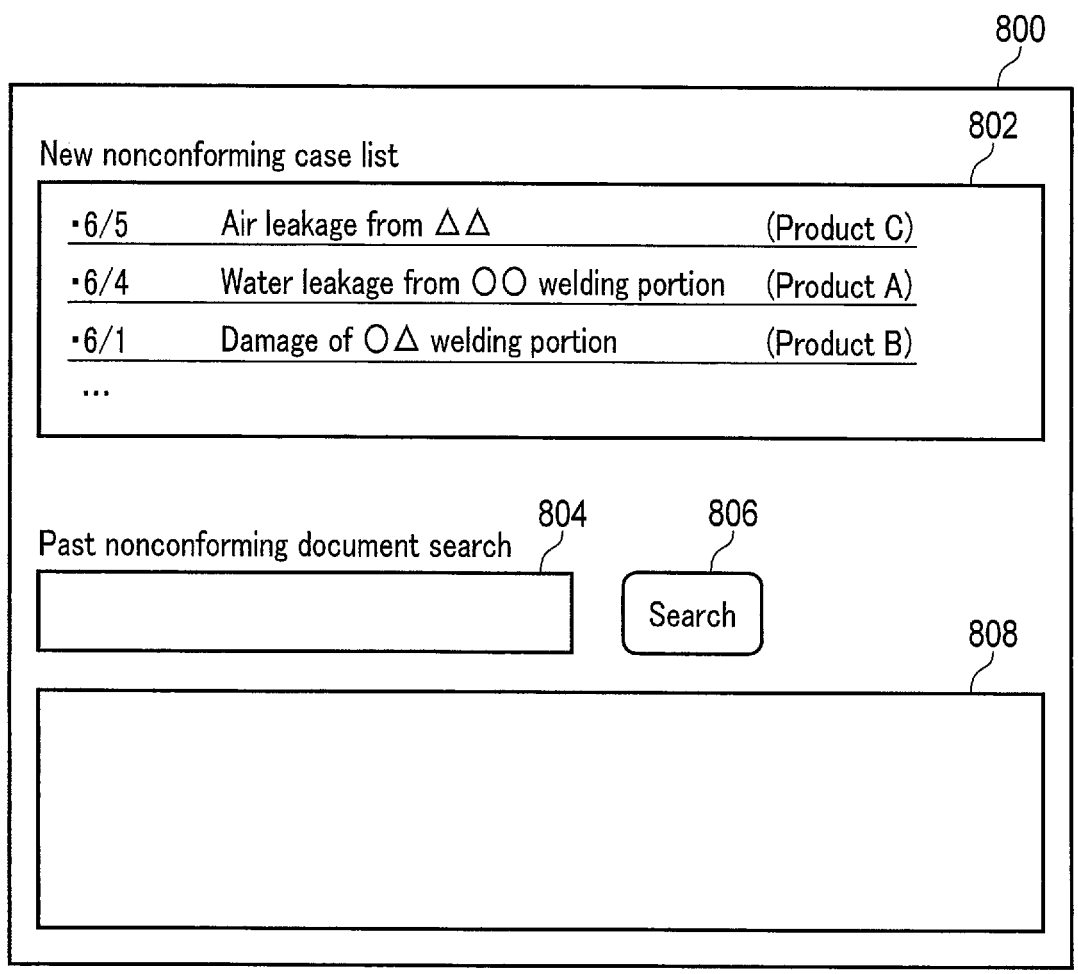
FIG. 8 is a diagram for explaining an operation of the document search server of FIG. 1.

FIG. 8 schematically shows an example of an initial interface screen in the document search function. A screen 800 shown in FIG. 8 includes a display region 802, a search query input column 804, a search button 806, and a display region 808.

The display region 802 displays a list of titles of the nonconforming case documents newly registered in the nonconforming case document storage unit 130. For example, a title of a nonconforming case document registered in the nonconforming case document storage unit 130 within a certain period (for example, within a week) is displayed in the display region 802. When the title displayed in the display region 802 is selected (for example, clicked on) by the user, display contents are switched to a screen for searching the related-event document.

The search query input column 804 is a column for inputting a search term to be used to search for the nonconforming case document. The search button 806 is a button for instructing execution of the search for the nonconforming case document. The display region 808 displays a search result of using the search term input to the search query input column 804. When the search button 806 is clicked in a state where the search term is input to the search query input column 804, a search is executed with respect to the nonconforming case document storage unit 130, and the search result is displayed in the display region 808. When the title displayed in the display region 808 is clicked, the display contents are switched to a screen to search for the related-event document.

Figure 9:
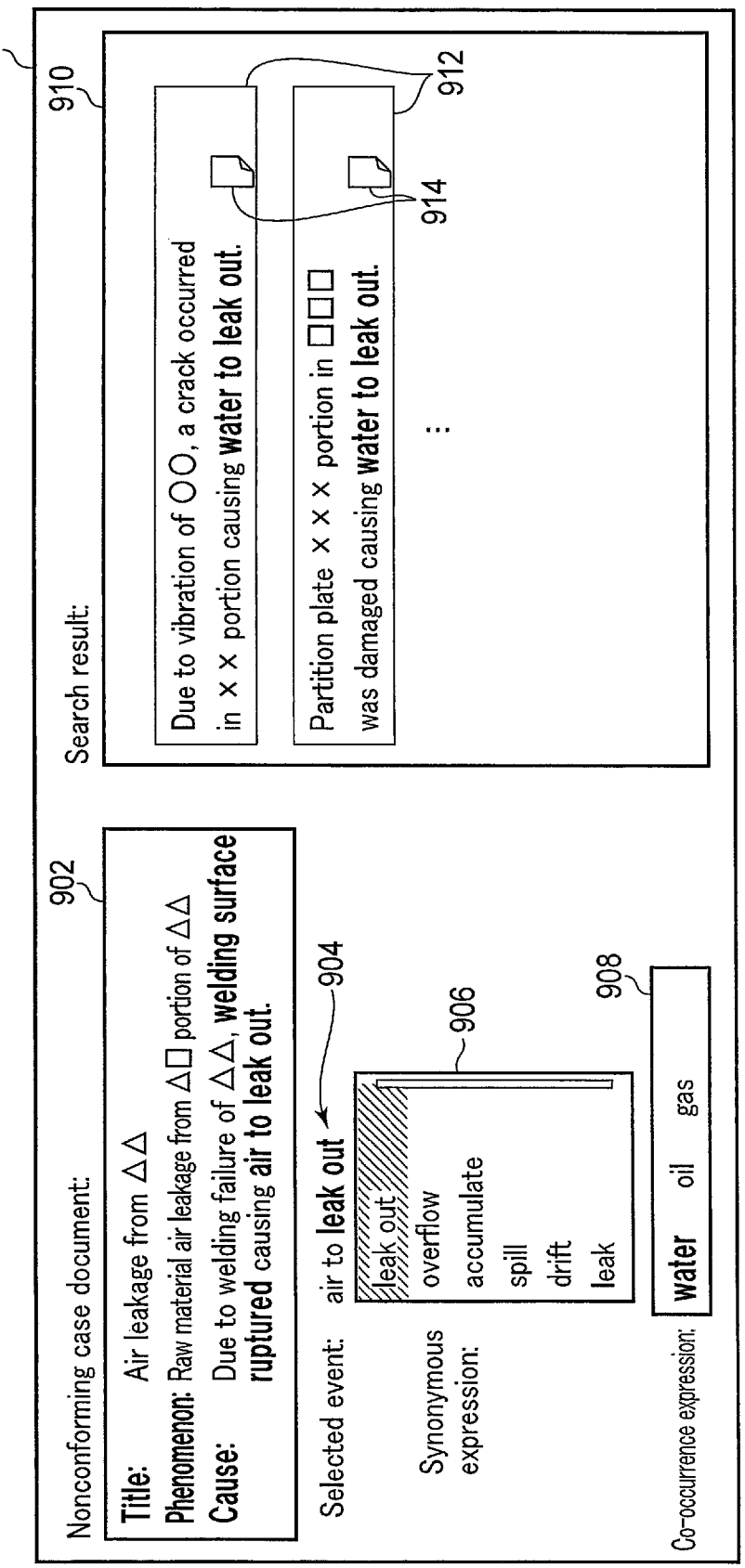
FIG. 9 is a diagram for explaining an operation of the document search server of FIG. 1.

FIG. 9 shows an example of a screen to search for the related-event document. A search screen 900 shown in FIG. 9 includes display regions 902, 904, 906, 908, and 910.

The display region 902 displays a nonconforming case document. The display region 902 is configured in a manner such that a user can select one of the event texts displayed in the display region 902. The event text selected from the display region 902 corresponds to the event text acquired by the text acquisition unit 112. The display region 904 displays the event text acquired by the text acquisition unit 112. The display region 906 displays the phenomenon expression acquired by the phenomenon expression acquisition unit 116 and the synonymous expression acquired by the synonymous expression acquisition unit 118. The display region 906 is configured in a manner such that the user can select one of the expressions. The display region 908 displays the co-occurrence expression acquired by the co-occurrence expression acquisition unit 122. The display region 908 is configured in a manner such that the user can select one of the expressions. The display region 910 displays a related-event document acquired by the related-document acquisition unit 126. The display region 910 includes portions 912 displaying the related-event document and icons 914 for displaying contents of the nonconforming case document, which is the extraction source of the related-event document.

The display region 902 and the portions 912 of the display region 910 are color-coded on a product basis. Alternatively, product names may be described in the display region 902 and the portions 912 of the display region 910. In this manner, the user is able to recognize which of the products relates to the searched related-event document, and to easily grasp the relevance thereof with the product the user is handling.

The search screen 900 is a screen after a title "air leakage from ΔΔ" displayed in the display region 802 is clicked. A nonconforming case document corresponding to the title "air leakage from ΔΔ" is displayed in the display region 902. Prior to the selection made by the user, any event text is automatically selected from among the event texts. In this example, the display region 902 includes two event texts, "welding surface ruptured" and "air to leak out", and the event text "air to leak out", which comes last, is selected. Therefore, the event text "air to leak out" is displayed in the display region 904.

The phenomenon expression acquisition unit 116 acquires "leak out", which is a verb, from the event text as the phenomenon expression. In the display region 904, the phenomenon expression "leak out" is shown in boldface type. The synonymous expression acquisition unit 118 acquires expressions "overflow", "accumulate", "spill", "drift", and "leak" as synonymous expressions from the synonymous expression dictionary 400 stored in the synonymous expression storage unit 132. Therefore, the expressions "leak out", "overflow", "accumulate", "spill", "drift", and "leak" are displayed in the display region 906. In the display region 906, the phenomenon expression "leak out" is displayed at the very top.

Prior to the selection made by the user, the selection unit 120 automatically selects any expression from among the expressions displayed in the display region 906. In this example, the selection unit 120 selects the phenomenon expression "leak out". The co-occurrence expression acquisition unit 122 acquires the expressions "water", "oil", and "gas" as co-occurrence expressions from the co-occurrence expression information stored in the co-occurrence expression storage unit 134. Therefore, the expressions "water", "oil", and "gas" are displayed in the display region 908.

Prior to the selection made by the user, the selection unit 124 automatically selects any given expression from among the expressions displayed in the display region 908. In this example, the selection unit 124 selects the expression "water". The related-document acquisition unit 126 uses the expression "leak out" and the expression "water" as the search terms and performs a search with respect to the event storage unit 136. The nonconforming case document obtained by the search is displayed in the display region 910.

When the event text "welding surface ruptured" is clicked on the search screen 900, the display contents are updated in the manner shown in FIG. 10. On a search screen 1000 shown in FIG. 10, the event text "welding surface ruptured" is displayed in the display region 904. The phenomenon expression acquisition unit 116 acquires the expression "ruptured" as the phenomenon expression, and the synonymous expression acquisition unit 118 acquires the expressions "blown out", "deformed", "precipitated", "worn", and "broken" as the synonymous expressions. Therefore, the display region 906 displays the expressions "ruptured", "blown out", "deformed", "precipitated", "worn", and "broken". Prior to the selection made by the user, the selection unit 120 selects the expression "ruptured", which is the phenomenon expression. The co-occurrence expression acquisition unit 122 acquires the expressions "piping" and "screw" as the co-occurrence expressions. Prior to the selection made by the user, the selection unit 124 selects the expression "piping", the related-document acquisition unit 126 uses the expressions "piping" and "ruptured" as the search terms and performs the document search, and the search result is displayed in the display region 910.

Figure 11:
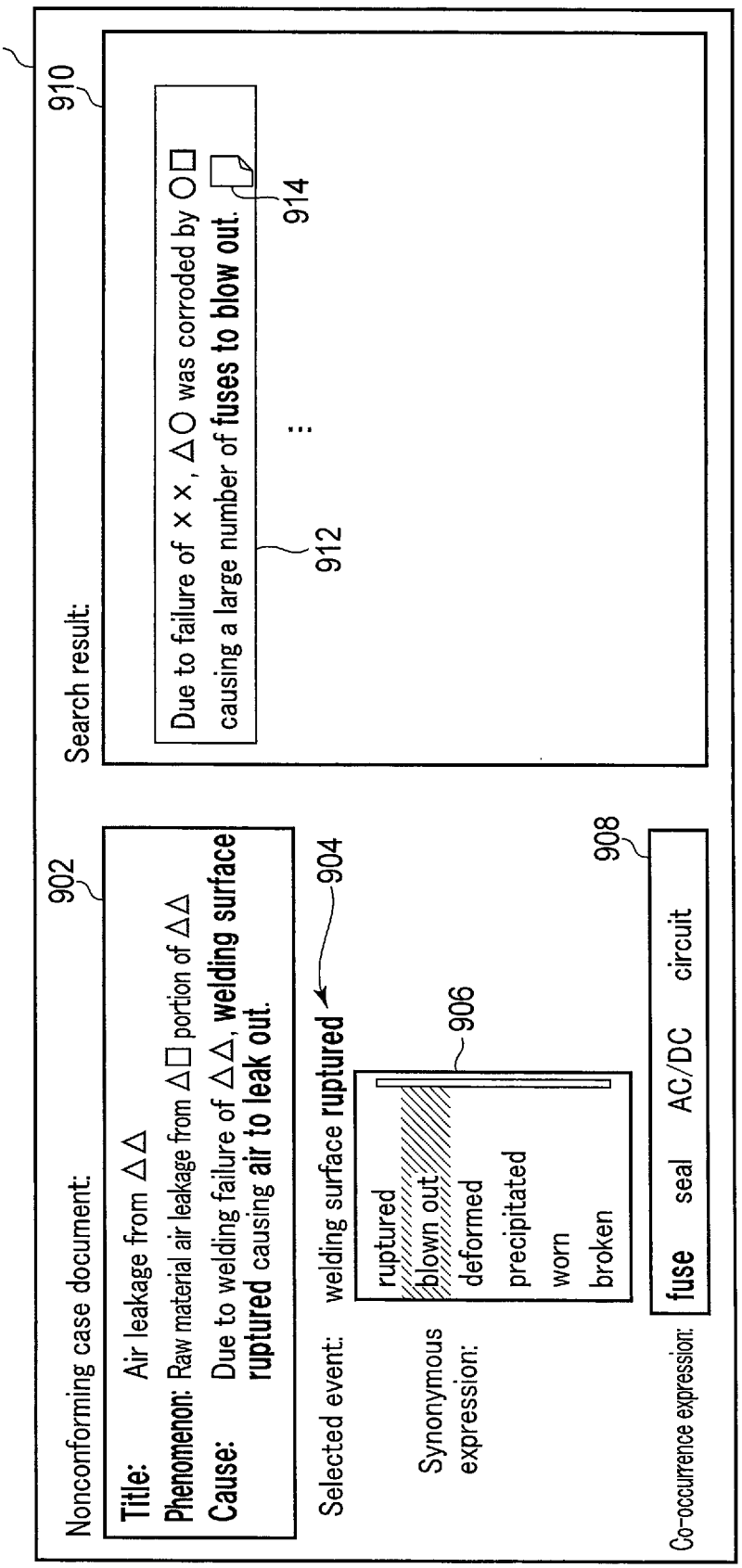
FIG. 11 is a diagram for explaining an operation of the document search server of FIG. 1.
Figure 12:
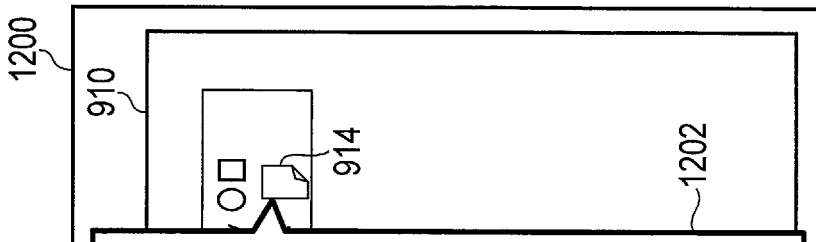
FIG. 12 is a diagram for explaining an operation of the document search server of FIG. 1.
Figure 13:
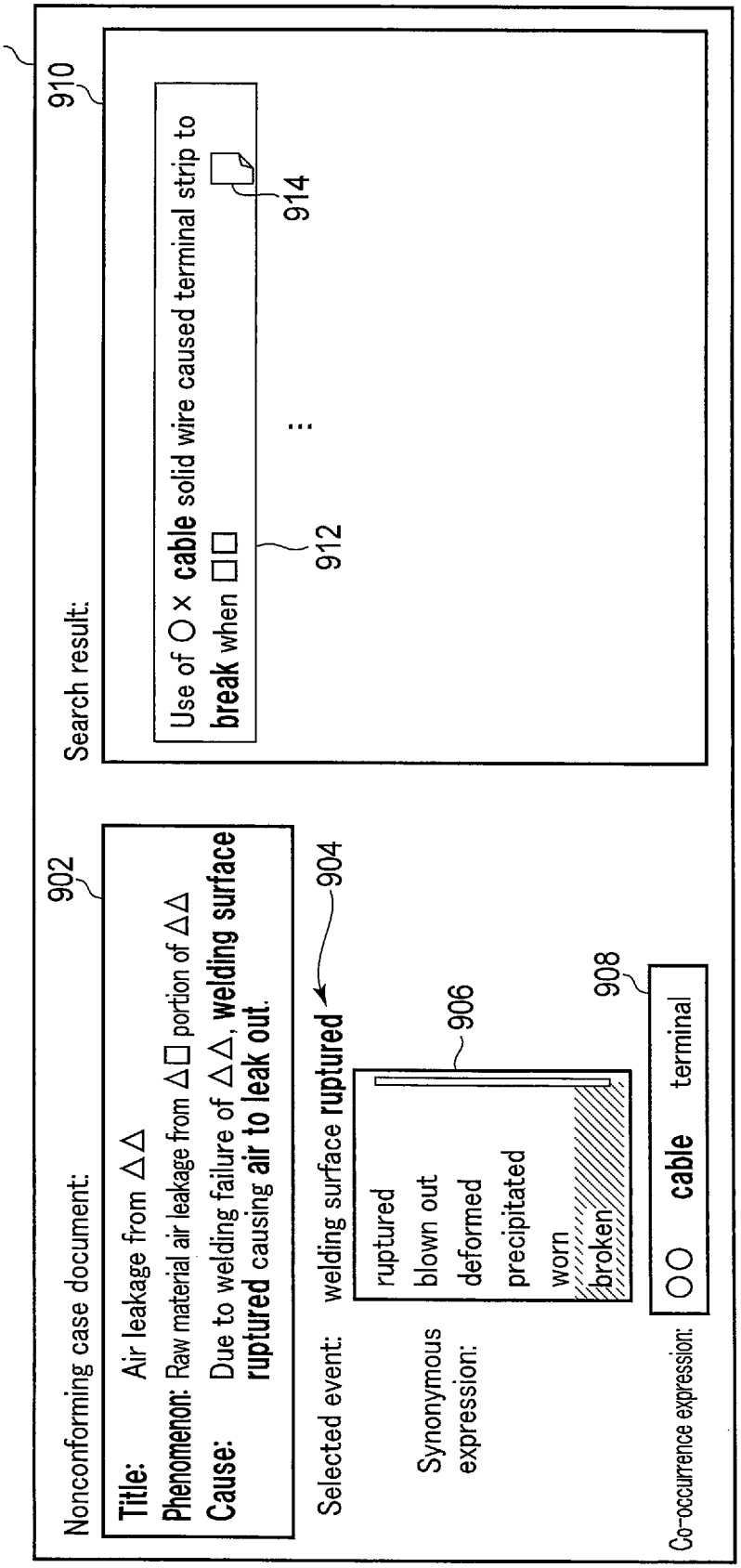
FIG. 13 is a diagram for explaining an operation of the document search server of FIG. 1.

When the synonymous expression "blown out" is clicked on the search screen 1000 by the user, the display contents are updated in the manner shown in FIG. 11. On a search screen 1100 shown in FIG. 11, expressions "fuse", "seal", "AC/DC", and "circuit" are displayed as the co-occurrence expression of "blown out" in the display region 908. Prior to the selection made by the user, the selection unit 120 selects the expression "fuse". The related-document acquisition unit 126 uses the expression "fuse" and "blown out" as the search terms and performs the document search, and the search result is displayed in the display region 910. When the icon 914 is moused over, contents 1202 of the nonconforming case document corresponding to the related-event document such as a search screen 1200 shown in FIG. 12 is displayed. The nonconforming case document corresponding to the related-event document is acquired from the nonconforming case document storage unit 130 by the related-document acquisition unit 126. Therefore, a cause of the nonconformity and measures to be taken thereto can be browsed.

When the expression "broken" is clicked on the search screen 1100 by the user, the co-occurrence expression acquisition unit 122 acquires the expressions "oo", "cable", and "terminal" as the co-occurrence expression of the expression "broken", and the display unit 128 displays the expressions "oo", "cable", and "terminal" in the display region 908. When the expression "cable" displayed in the display region 908 is clicked by the user, the display contents are updated in the manner shown in FIG. 13. On a search screen 1300 shown in FIG. 13, a result of the document search performed by the related-document acquisition unit 126 using the expressions "cable" and "broken" as the search terms is displayed in the display region 910.

In the manner described above, the document search server 110 acquires an event text relating to an event, acquires a phenomenon expression expressing a phenomenon of the event from the event text, acquires a synonymous expression having a meaning similar to that of the phenomenon expression, acquires at least one co-occurrence expression co-occurring with an expression selected from a expression set including the phenomenon expression and the synonymous expression, acquires a related-event document from a plurality of nonconforming case documents prepared in advance by performing a search using the selected expression and one of the at least one co-occurrence expression as search terms, and displays the related-event document. In this manner, the user is able to easily obtain documents describing a nonconforming case relating to a product similar to the product handled by the user, and a nonconforming case considered to relate to the product handled by the user. Documents that cannot be obtained by a normal search (for example, a search that is performed by the user inputting a keyword or a text) due to different expressions in the documents can be obtained. By referring to the documents obtained by the search, the user can grasp problems that may occur with the product the user is handling and measures to be taken thereto. The user will be able to avoid problems which may occur with the product the user is handling. Therefore, according to the first embodiment, accumulated knowledge can be effectively utilized.

Second Embodiment

FIG. 14 schematically shows a document search system 1400 according to a second embodiment. As shown in FIG. 14, the document search system 1400 includes a document search server 1410 and a user terminal 150. The document search server 1410 includes a text acquisition unit 112, an expression acquisition unit 1412, a selection unit 124, a related-document acquisition unit 126, a display unit 128, a nonconforming case document storage unit 130, a synonymous expression storage unit 132, a co-occurrence expression storage unit 134, and an event storage unit 136. The expression acquisition unit 1412 includes a phenomenon expression acquisition unit 116, a synonymous expression acquisition unit 118, a selection unit 120, a co-occurrence expression acquisition unit 122, and a calculation unit 1414.

That is, the expression acquisition unit 1412 is obtained by adding the calculation unit 1414 to the expression acquisition unit 114 shown in FIG. 1.

The calculation unit 1414 calculates a priority for displaying each co-occurrence expression acquired by the co-occurrence expression acquisition unit 122. For example, the calculation unit 1414 calculates a degree of co-occurrence between the expression selected by the selection unit 120 and each of the co-occurrence expressions, and gives a higher priority to the co-occurrence expression with a higher degree of co-occurrence. The degree of co-occurrence is an indicator indicating how often a certain expression (word) and another expression (word) appear simultaneously in the same sentence or document. Alternatively, the calculation unit 1414 may perform, for each co-occurrence expression, processing of retrieving event documents each including both the selected expression and the co-occurrence expression from the event storage unit 136, obtains distances (for example, the number of letters or words between the selected expression and the co-occurrence expression) between the selected expression and the co-occurrence in the respective retrieved event documents, calculating an average of the distances, and calculating a priority from the calculated average of the distances so that the priority becomes higher as the average of distances becomes smaller.

The display unit 128 displays the synonymous expressions in descending order of priority in a display region. For example, the display unit 128 displays the synonymous expressions in descending order of priority from left to right in a display region 908 (FIG. 9). Prior to the selection made by a user, the selection unit 124 selects the co-occurrence expression with the highest priority.

In the second embodiment, the calculation unit 1414 calculates the degree of co-occurrence or the distance between the expression selected by the selection unit 120 and each of the co-occurrence expressions acquired by the co-occurrence expression acquisition unit 122, and the display unit 128 displays the co-occurrence expressions in an order based on the degree of co-occurrence or the distance calculated by the calculation unit 1414. Prior to the selection made by the user, the co-occurrence expression with the shortest distance is selected among the co-occurrence expressions acquired by the co-occurrence expression acquisition unit 122, and a document search is executed using the selected co-occurrence expression. There is a high probability that the co-occurrence expression with the shortest distance relates to the product handled by the user. Therefore, it may be possible to save the user from the trouble of having to select the co-occurrence expression.

Third Embodiment

Figure 15:
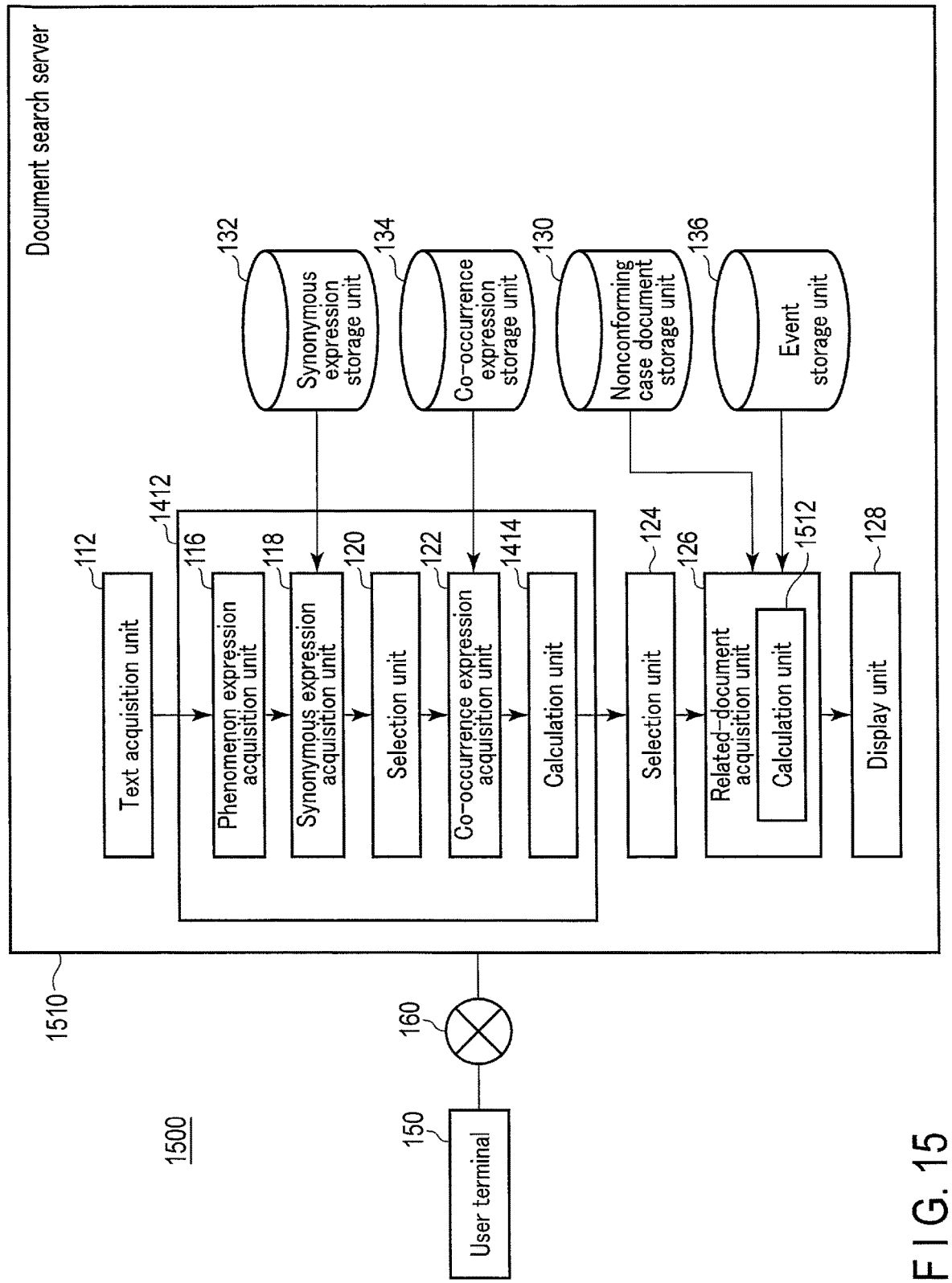
FIG. 15 is a diagram showing a document search system according to a third embodiment.

FIG. 15 schematically shows a document search system 1500 according to a third embodiment. As shown in FIG. 15, the document search system 1500 includes a document search server 1510 and a user terminal 150. The document search server 1510 includes a text acquisition unit 112, an expression acquisition unit 1412, a selection unit 124, a related-document acquisition unit 126, a display unit 128, a nonconforming case document storage unit 130, a synonymous expression storage unit 132, a co-occurrence expression storage unit 134, and an event storage unit 136. The related-document acquisition unit 126 includes a calculation unit 1512.

The calculation unit 1512 calculates a priority for displaying each related-event document acquired by the related-document acquisition unit 126. For example, the calculation unit 1512 performs, for each related-event document, processing of calculating a distance (for example, the number of letters or words between the expressions) between two expressions used for a search in the related-event document, and calculating a priority from the obtained distance in a manner such that the priority becomes higher as the distance becomes shorter.

In the example of FIG. 9, the search is executed by using the expressions "water" and "leak out", and the two related-event documents are displayed in the display region 910. In the related-event document at the very top of the display region 910, "to" exists between the expression "water" and the expression "leak out". Therefore, the distance between the expressions is one. The distance between the expressions for the second related-event document from the top in the display region 910 is also one. Therefore, the two related-event documents have the same priority.

The display unit 128 displays the related-event documents in the order of higher priority in the display region. For example, the display unit 128 displays the related-event documents in descending order of priority from top to bottom in the display region 910 (FIG. 9).

In the third embodiment, the calculation unit 1512 calculates the distance between the two expressions used for the search with respect to each of the related-event documents acquired by the related-document acquisition unit 126, and the display unit 128 displays the related-event documents in an order based on the distance. The display unit 128 displays the related-event documents with a shorter distance in a higher ranking. There is a high probability that the related-event document with a shorter distance is related to the product handled by the user. Therefore, the related-event document that is highly related to the product handled by the user is displayed at a position noticeable to the user.

Fourth Embodiment

Figure 16:
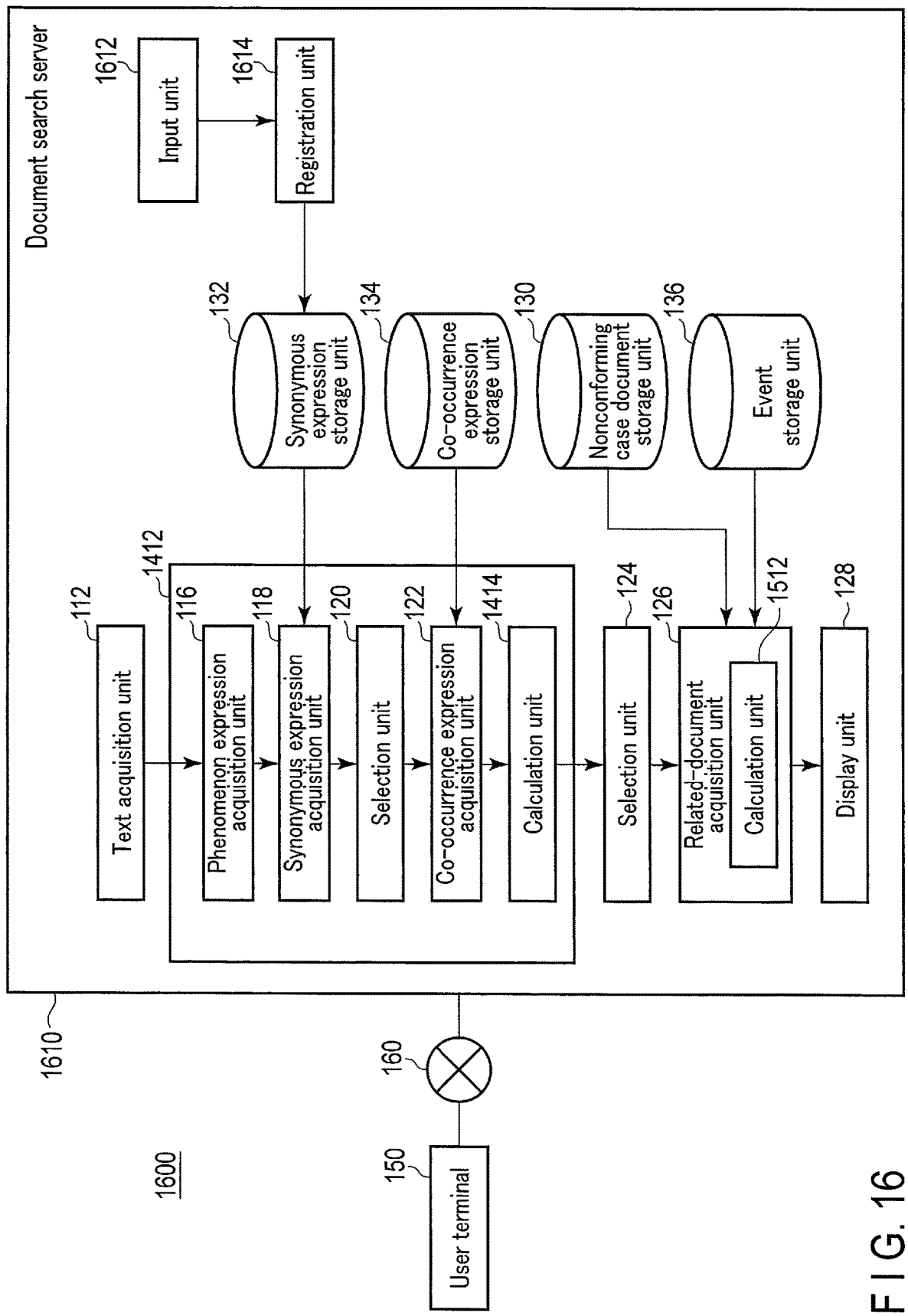
FIG. 16 is a diagram showing a document search system according to a fourth embodiment.

FIG. 16 schematically shows a document search system 1600 according to a fourth embodiment. As shown in FIG. 16, the document search system 1600 includes a document search server 1610 and a user terminal 150. The document search server 1610 includes a text acquisition unit 112, an expression acquisition unit 1412, a selection unit 124, a related-document acquisition unit 126, a display unit 128, a nonconforming case document storage unit 130, a synonymous expression storage unit 132, a co-occurrence expression storage unit 134, an event storage unit 136, an input unit 1612, and a registration unit 1614. That is, the document search server 1610 is obtained by adding the input unit 1612 and the registration unit 1614 to the document search server 1510 shown in FIG. 15.

In addition to the synonymous expression information explained in the first embodiment, the synonymous expression storage unit 132 stores user registration synonymous expression information. In order to acquire a synonymous expression, the synonymous expression acquisition unit 118 refers to both the synonymous expression information (for example, the synonymous expression dictionary 400 shown in FIG. 4) and the user registration synonymous expression information (for example, a user registration synonymous expression dictionary 1800 shown in FIG. 18).

The input unit 1612 acquires an expression having a meaning similar to that of a phenomenon expression acquired by the phenomenon expression acquisition unit 116, input by a user. The registration unit 1614 registers the phenomenon expression acquired by the phenomenon expression acquisition unit 116 and the expression input by the user in association with each other in the synonymous expression storage unit 132. Specifically, the registration unit 1614 adds information associating the phenomenon expression acquired by the phenomenon expression acquisition unit 116 with the expression input by the user to the user registration synonymous expression information.

Figure 17:
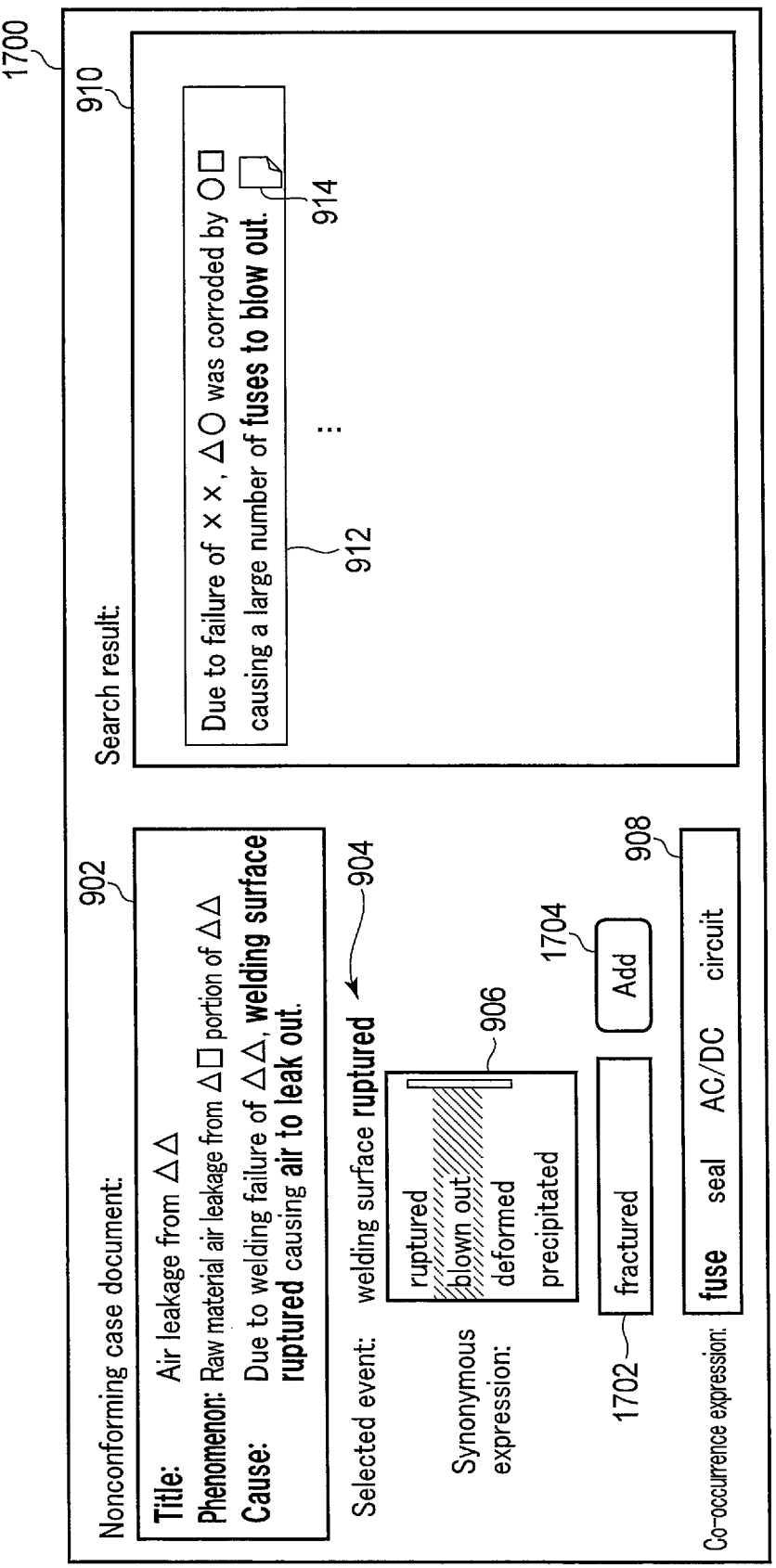
FIG. 17 is a diagram showing an example of a search screen according to the fourth embodiment.

FIG. 17 shows an example of a search screen according to the fourth embodiment. A search screen 1700 shown in FIG. 17 includes display regions 902, 904, 906, 908, and 910, a synonymous expression input column 1702, and a registration button 1704. The synonymous expression input column 1702 is a column for inputting an expression having a meaning similar to that of a phenomenon expression displayed in the display region 904 (in this example, "ruptured"). The registration button 1704 is a button for instructing execution of registration of a synonymous expression. When the registration button 1704 is clicked in a state where an expression is input to the synonymous expression input column 1702 (in this example, "fractured"), the synonymous expression is registered. When the synonymous expression is registered, the registered synonymous expression is added to the display region 906.

FIG. 18 shows the user registration synonymous expression dictionary 1800, which is an example of the user registration synonymous expression information stored in the synonymous expression storage unit 132. As shown in FIG. 18, the user registration synonymous expression dictionary 1800 includes an identification number 1802, a phenomenon expression 1804, and a synonymous expression 1806 in association with each other. The identification number 1802 is identification information for identifying entries of the user registration synonymous expression dictionary 1800. The synonymous expression 1806 includes one or more synonymous expressions. As expressions having meanings similar to that of an expression "leakage", "seepage" and "discharge" are registered.

In the fourth embodiment, it is possible for a user to register an expression having a meaning similar to that of a phenomenon expression acquired by the phenomenon expression acquisition unit 116 to the synonymous expression storage unit 132. This improves comprehensiveness of the document search.

Fifth Embodiment

FIG. 19 schematically shows a document search system 1900 according to a fifth embodiment. As shown in FIG. 19, the document search system 1900 includes a document search server 1910 and a user terminal 150. The document search server 1910 includes a text acquisition unit 112, an expression acquisition unit 1412, a selection unit 124, a related-document acquisition unit 126, a display unit 128, a nonconforming case document storage unit 130, a synonymous expression storage unit 132, a co-occurrence expression storage unit 134, an event storage unit 136, an input unit 1612, a registration unit 1614, an input unit 1912, a registration unit 1914, and a related-event storage unit 1916. That is, the document search server 1910 is obtained by adding the input unit 1912, the registration unit 1914, and the related-event storage unit 1916 to the document search server 1610 shown in FIG. 16.

The input unit 1912 acquires a related-event document relating to an event text acquired by the text acquisition unit 112 and selected by a user from among related-event documents acquired by the related-document acquisition unit 126. The registration unit 1914 registers the related-event document acquired by the input unit 1912 and the event text acquired by the text acquisition unit 112 in association with each other in the related-event storage unit 1916.

Figure 20:
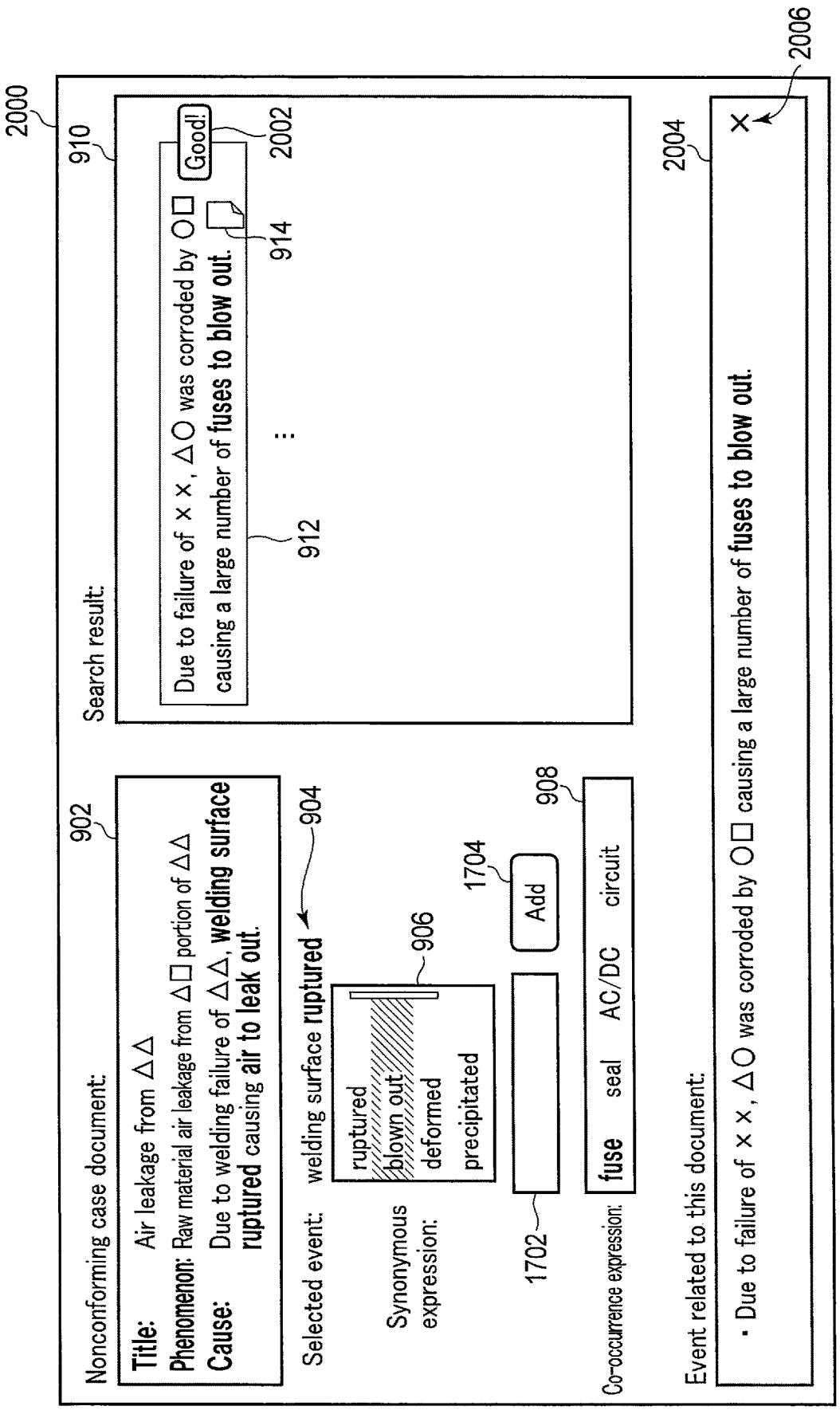
FIG. 20 is a diagram showing an example of a search screen according to the fifth embodiment.

FIG. 20 shows an example of a search screen according to the fifth embodiment. A search screen 2000 shown in FIG. 20 includes display regions 902, 904, 906, 908, and 910, a synonymous expression input column 1702, a registration button 1704, a registration button 2002, a display region 2004, and a delete button 2006.

The registration button 2002 is a button for instructing registration of a related-event document. In a case where the display region 910 includes a related-event document determined by the user as having a problem structure similar to an event text displayed in the display region 904, the user clicks the registration button 2002 beside the related-event document. The input unit 1912 receives the related-event document selected by the user and the event text as an input. The registration unit 1914 adds information associating the related-event document with the event text to related-event information stored in the related-event storage unit 1916. The display unit 128 updates the search screen and displays the newly registered related-event document in the display region 2004.

The delete button 2006 is a button for deleting the related-event document. When the delete button 2006 beside the related-event document is clicked by the user, the related-event document is deleted from the related-event storage unit 1916.

FIG. 21 shows an example of the related-event information stored in the related-event storage unit 1916. Related-event information 2100 shown in FIG. 21 includes identification numbers 2102, 2104, 2106, 2110, and 2112, and event texts 2108 and 2114. The identification number 2102 is identification information for identifying entries of the related-event information. The identification number 2104 indicates an identification number associated with a nonconforming case document in which the event text 2108 is included. The identification number 2104 corresponds to the identification number 202 shown in FIG. 2 and the identification number 604 shown in FIG. 6. The identification number 2106 is identification information for identifying each event. In the present embodiment, the identification number 2106 indicates the order in which the event text 2108 emerges in the nonconforming case document. The event text 2108 indicates the event text acquired by the input unit 1912. The identification number 2110 indicates an identification number allocated to the nonconforming case document including the event text 2114. The identification number 2110 corresponds to the identification number 202 shown in FIG. 2 and the identification number 604 shown in FIG. 6. The identification number 2112 is identification information for identifying each event. In the present embodiment, the identification number 2112 indicates the order in which the event text 2114 emerges in the nonconforming case document. The event text 2114 indicates an event text extracted from the related-event document acquired by the input unit 1912.

In the fifth embodiment, the related-document acquisition unit 126 performs search with respect to the event storage unit 136 and the related-event storage unit 1916. The nonconforming case document storage unit 130, the event storage unit 136, and the related-event storage unit 1916 form a database referred to by the related-document acquisition unit 126. The related-document acquisition unit 126 uses the event text acquired by the text acquisition unit 112 to refer to the related-event information stored in the related-event storage unit 1916, and acquires the related-event document associated with the event text. For example, in a case where an event text "welding surface ruptured" is acquired by the text acquisition unit 112, the related-document acquisition unit 126 refers to the related-event information 2100 shown in FIG. 21, and acquires a nonconforming case document whose identification number 2110 is 2939, and a nonconforming case document whose identification number 2110 is 4001. The display unit 128 displays these nonconforming case documents in, for example, the display region 2004 shown in FIG. 20. In this manner, by explicitly displaying a document a user determines as being related to an event text on a screen, it would be easier for the user to grasp the problem related to the event text. A related-event document registered by other users may also be displayed in the display region 2004. This will allow the user to notice a relevance of problems between the other products and the product the user is handling, and matters to be noted.

Sixth Embodiment

Figure 22:
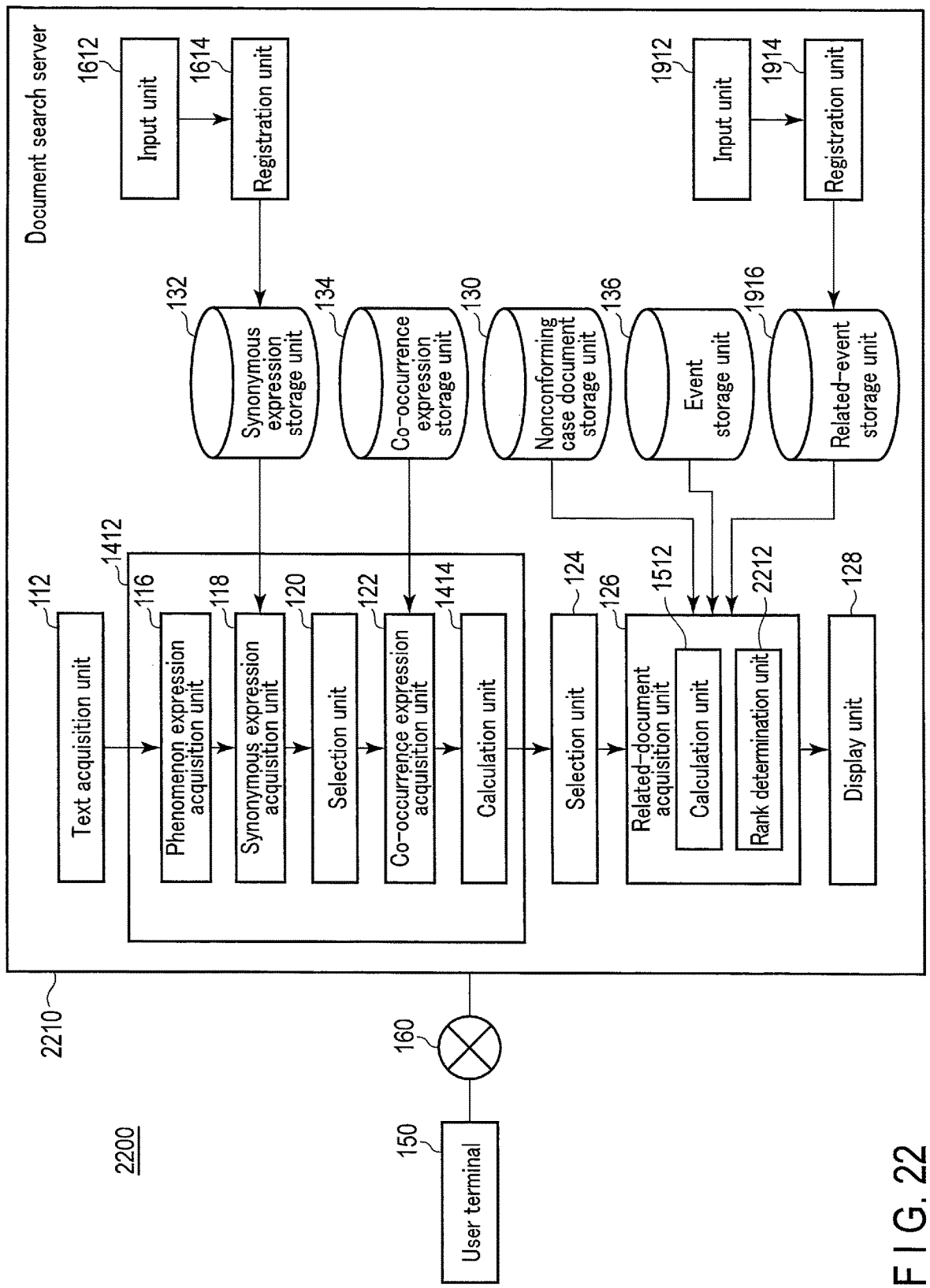
FIG. 22 is a diagram showing a document search system according to a sixth embodiment.

FIG. 22 schematically shows a document search system 2200 according to a sixth embodiment. As shown in FIG. 22, the document search system 2200 includes a document search server 2210 and a user terminal 150. The document search server 2210 includes a text acquisition unit 112, an expression acquisition unit 1412, a selection unit 124, a related-document acquisition unit 126, a display unit 128, a nonconforming case document storage unit 130, a synonymous expression storage unit 132, a co-occurrence expression storage unit 134, an event storage unit 136, an input unit 1612, a registration unit 1614, an input unit 1912, a registration unit 1914, and a related-event storage unit 1916. The related-document acquisition unit 126 includes a calculation unit 1512 and a rank determination unit 2212.

The rank determination unit 2212 determines a ranking of a related-event document that the related-document acquisition unit 126 acquired by referring to the event storage unit 136 based on related-event information stored in the related-event storage unit 1916. The related-event document stored in the related-event storage unit 1916 is a document explicitly indicated as being related to an event text by a user. In a case where the event text acquired by the text acquisition unit 112 and the related-event document that the related-document acquisition unit 126 acquired by referring to the event storage unit 136 are associated in the related-event information, the rank determination unit 2212 determines the related-event document to be displayed with higher rankings. The display unit 128 displays the related-event document in accordance with the ranking determined by the rank determination unit 2212.

In the sixth embodiment, in a case where the event text acquired by the text acquisition unit 112 and the related-event document that the related-document acquisition unit 126 acquired by referring to the event storage unit 136 are associated in the related-event information, the related-event document is displayed with higher rankings. This allows the user to notice the nonconforming case documents that are highly related to a product the user himself/herself is handling.

At least a part of the processing explained in each of the embodiments may be realized by executing a program by a circuit such as a central processing unit (CPU).

FIG. 23 schematically shows a hardware configuration example of a computer 2400. As shown in FIG. 23, the computer 2400 includes a CPU 2402, a random access memory (RAM) 2404, a program memory 2406, a storage device 2408, and a communication interface 2410.

The CPU 2402 is an example of a general-purpose circuit. The RAM 2404 is used as a working memory by the CPU 2402. The RAM 2404 includes a volatile memory such as a synchronous dynamic random access memory (SDRAM). The program memory 2406 stores a program to be executed by the CPU 2402, such as a document search program. The program includes computer-executable instructions. As the program memory 2406, for example, a read-only memory (ROM) is used. The CPU 2402 loads the program stored in the program memory 2406 on the RAM 2404 to interpret and execute the program. When executed by the CPU 2402, the document search program causes the CPU 2402 to perform the processing explained in relation to the document search server according to each embodiment.

A program such as the document search program may be offered to the computer 2400 in a state where the program is stored in a computer-readable storage medium. In this case, for example, the computer 2400 includes a drive that reads data from the storage medium, and acquires the program from the storage medium. Examples of the storage medium include a magnetic disk, an optical disk (CD-ROM, CD-R, DVD-ROM, DVD-R, etc.), a magnetic optical disk (MO, etc.), and a semiconductor memory. Furthermore, the program may be stored in a server on a network, and the computer 2400 may download the program from the server.

The storage device 2408 stores data such as nonconforming case document information, synonymous expression information, and co-occurrence expression information. The storage device 2408 includes a non-volatile memory such as a hard disk drive (HDD) or a solid state drive (SSD). A part of the region of the storage device 2408 may be used as the program memory 2406.

The communication interface 2410 is an interface for communicating with an external apparatus, such as the user terminal 150. The communication interface 2410 includes wired communication modules, such as a wired local area network (LAN) module. Alternatively, the communication interface 2410 may include wireless communication modules.

Furthermore, at least a part of the processing explained in each of the embodiments may be performed by a dedicated circuit such as an application specific integrated circuit (ASIC) or a field programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document search apparatus comprising:
processing circuitry configured to:
acquire an event text relating to an event;
acquire a phenomenon expression from the event text, the phenomenon expression being an expression indicating a phenomenon of the event;
acquire a synonymous expression, the synonymous expression being an expression having a meaning similar to a meaning of the phenomenon expression;
acquire at least one co-occurrence expression, the at least one co-occurrence expression being an expression co-occurring with a selected expression selected from among a plurality of expressions including the phenomenon expression and the synonymous expression;
perform a search, using the selected expression and one co-occurrence expression from the at least one co-occurrence expression as search terms to acquire at least one related-event document from a plurality of documents prepared in advance; and
output the at least one related-event document.

2. The apparatus according to claim 1, wherein the processing circuitry is configured to:
calculate a distance between the selected expression and the at least one co-occurrence expression; and
display the at least one co-occurrence expression in ascending order of the calculated distance.

3. The apparatus according to claim 1, wherein the processing circuitry is configured to:
calculate a distance between the phenomenon expression and the one co-occurrence expression in each of the at least one related-event document; and
display the at least one related-event document in ascending order of the calculated distance.

4. The apparatus according to claim 1, wherein the processing circuitry is configured to:
acquire an expression, which has a meaning similar to the meaning of the phenomenon expression, input by a user; and
register the acquired phenomenon expression and the input expression in association with each other in synonymous expression information, the synonymous expression information being referred to by the processing circuitry to acquire the synonymous expression.

5. The apparatus according to claim 1, wherein the processing circuitry is configured to:
acquire a document selected by a user from among the related-event documents; and
register the selected document and the event text in association with each other in related-event information.

6. The apparatus according to claim 5, wherein the processing circuitry is configured to display the at least one related-event document in a higher ranking in a case where the event text and the at least one related-event document are associated with each other in the related-event information.

7. The apparatus according to claim 1, wherein the phenomenon expression is a word or a phrase expressing an operation.

8. The apparatus according to claim 1, wherein the at least one co-occurrence expression is a noun other than a noun expressing an operation.

9. The apparatus according to claim 1, wherein the event is a problem event.

10. A document search method comprising:
acquiring an event text relating to an event;
acquiring a phenomenon expression from the event text, the phenomenon expression being an expression indicating a phenomenon of the event;
acquiring a synonymous expression, the synonymous expression being an expression having a meaning similar to a meaning of the phenomenon expression;
acquiring at least one co-occurrence expression, the at least one co-occurrence expression being an expression co-occurring with a selected expression selected from among a plurality of expressions including the phenomenon expression and the synonymous expression;
performing a search, using the selected expression and one co-occurrence expression from the at least one co-occurrence expression as search terms, to acquire at least one related-event document from a plurality of documents prepared in advance; and
outputting the at least one related-event document.

11. A non-transitory computer readable medium including computer executable instructions, wherein the instructions, when executed by a processor, cause the processor to perform a method comprising:
acquiring an event text relating to an event;
acquiring a phenomenon expression from the event text, the phenomenon expression being an expression indicating a phenomenon of the event;
acquiring a synonymous expression, the synonymous expression being an expression having a meaning similar to a meaning of the phenomenon expression;
acquiring at least one co-occurrence expression, the at least one co-occurrence expression being an expression co-occurring with a selected expression selected from among a plurality of expressions including the phenomenon expression and the synonymous expression;
performing a search, using the selected expression and one co-occurrence expression from the at least one co-occurrence expression as search terms, to acquire at least one related-event document from a plurality of documents prepared in advance; and
outputting the at least one related-event document.

* * * * *